Figure 4A:
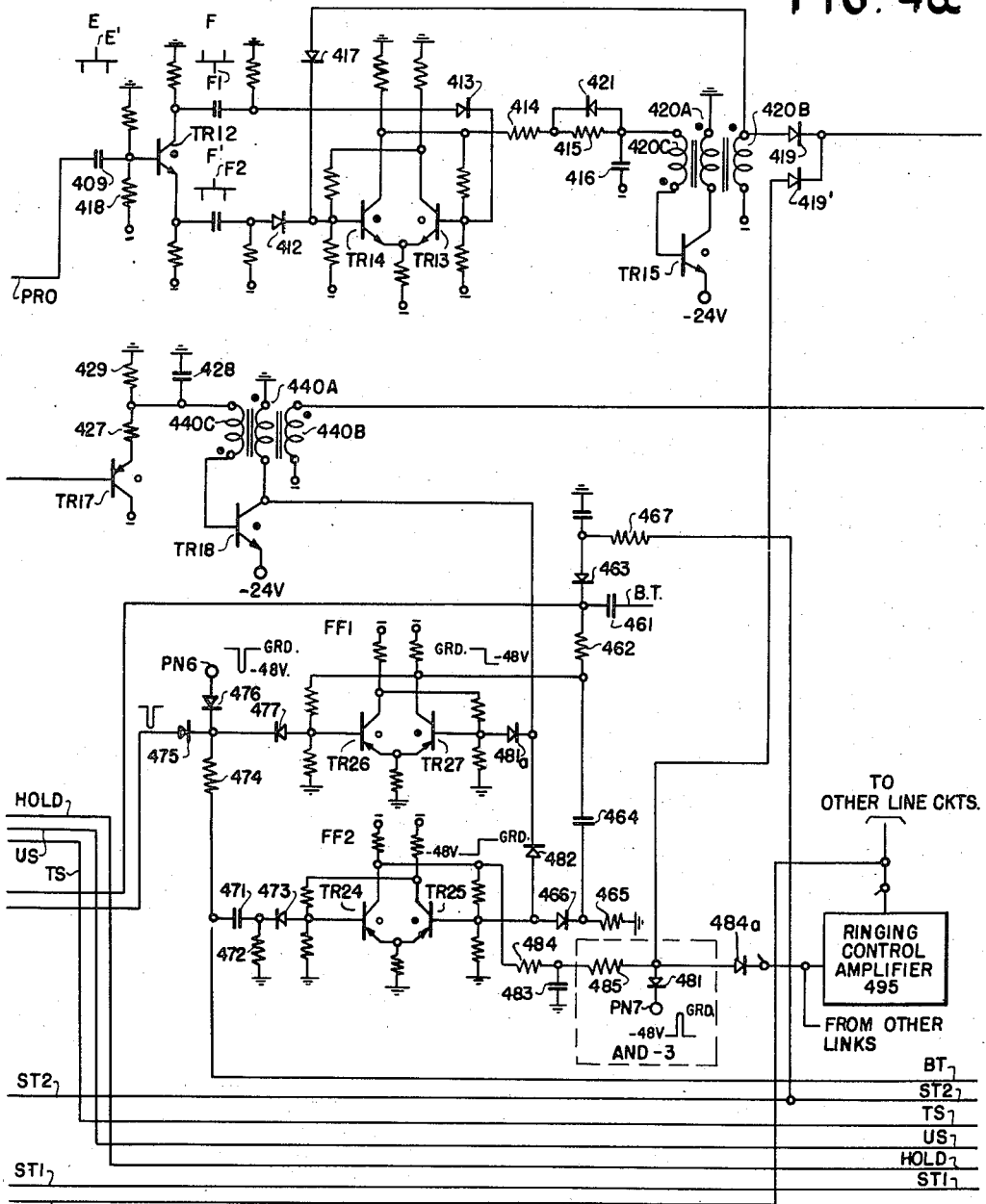

RE 25,139
Sept. 30, 1958      A. H. FAULKNER      2,854,516
ELECTRONIC TELEPHONE SYSTEM
Filed Nov. 23, 1955      9 Sheets-Sheet 1
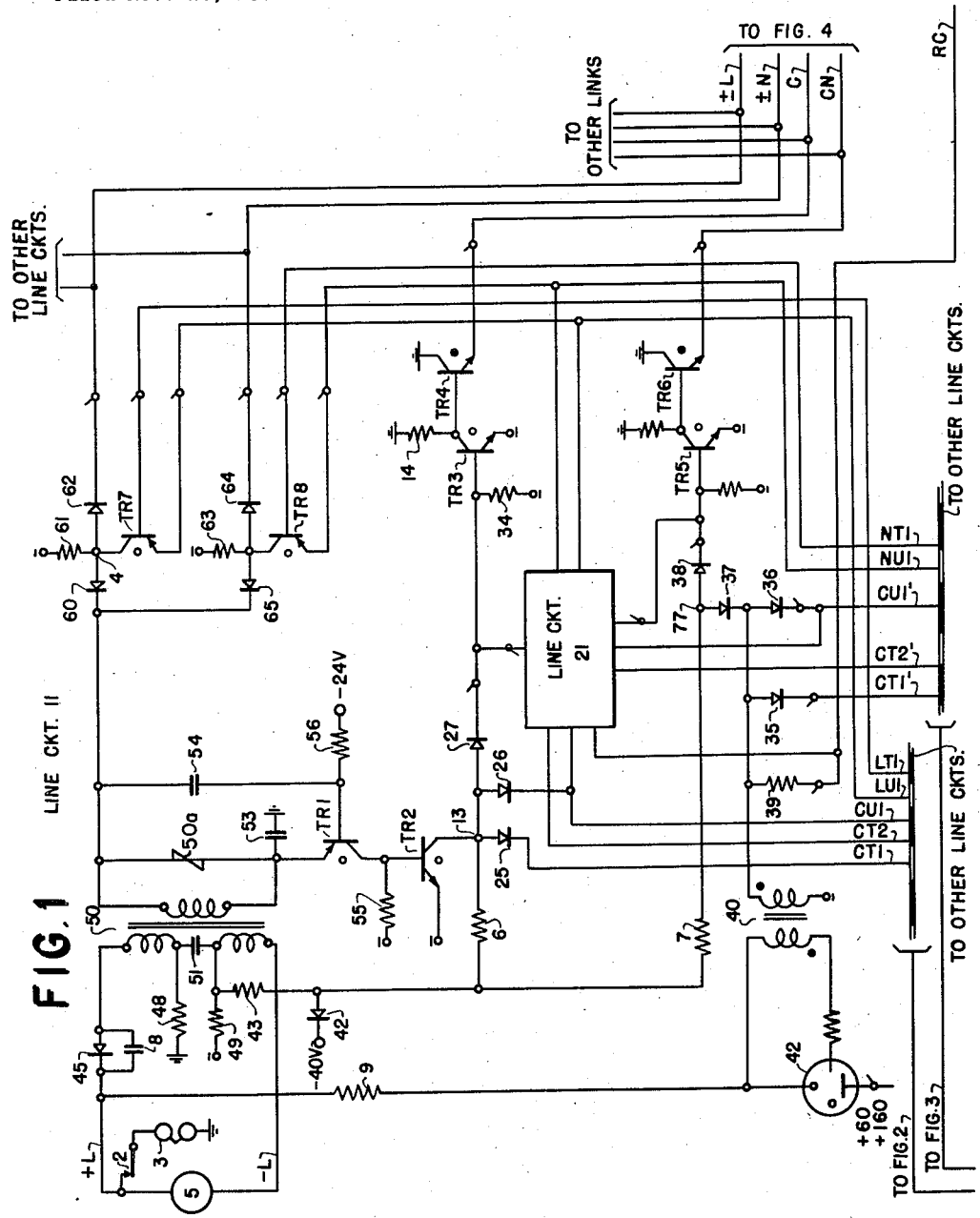
*INVENTOR.*
ALFRED H. FAULKNER
BY
ATTY.

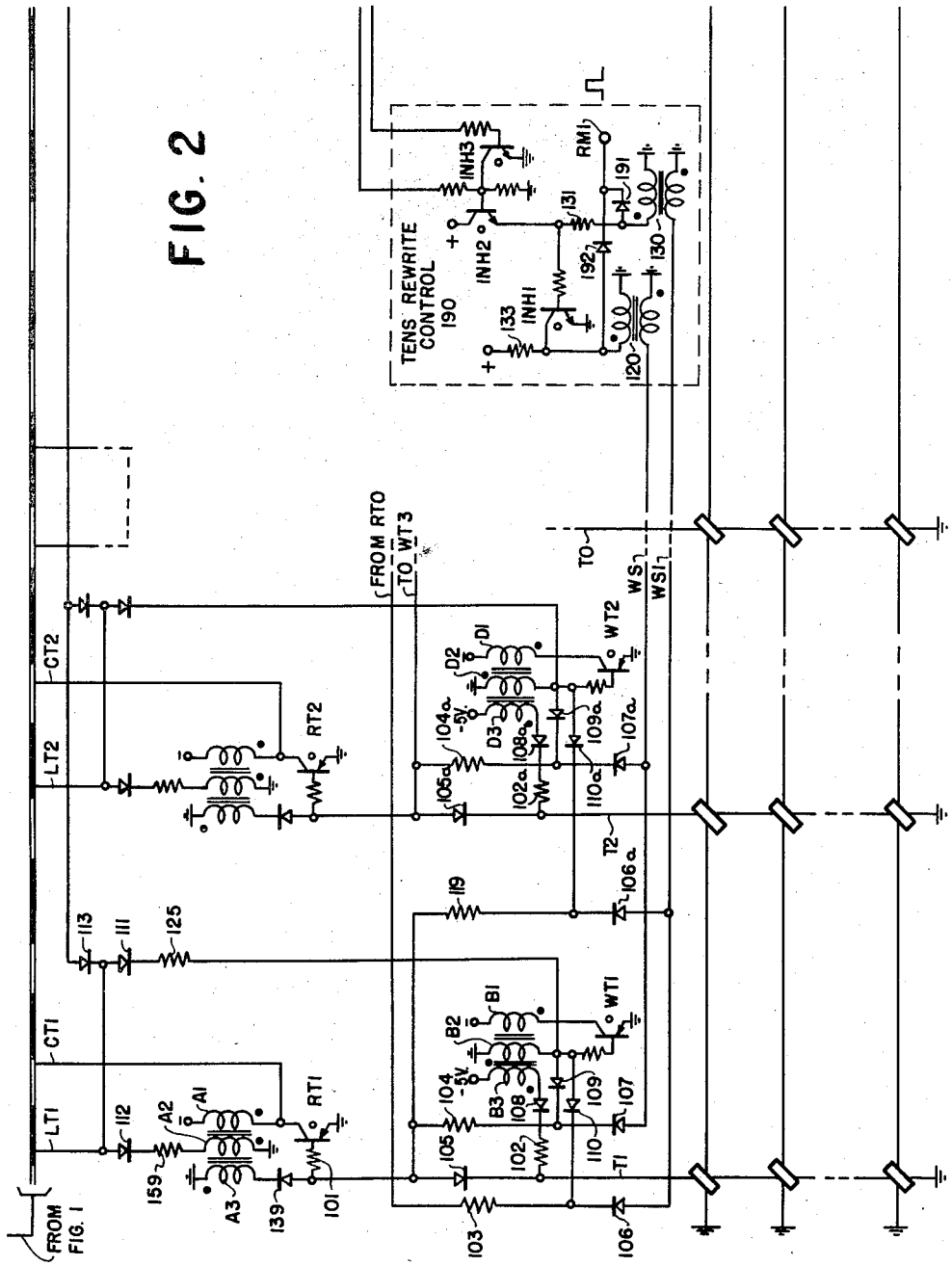

Sept. 30, 1958  A. H. FAULKNER  2,854,516
ELECTRONIC TELEPHONE SYSTEM
Filed Nov. 23, 1955  9 Sheets-Sheet 3

FIG. 2a

FIG. 2b

INVENTOR.
ALFRED H. FAULKNER
BY
ATTY.

Sept. 30, 1958
A. H. FAULKNER
2,854,516
ELECTRONIC TELEPHONE SYSTEM
Filed Nov. 23, 1955
9 Sheets-Sheet 4
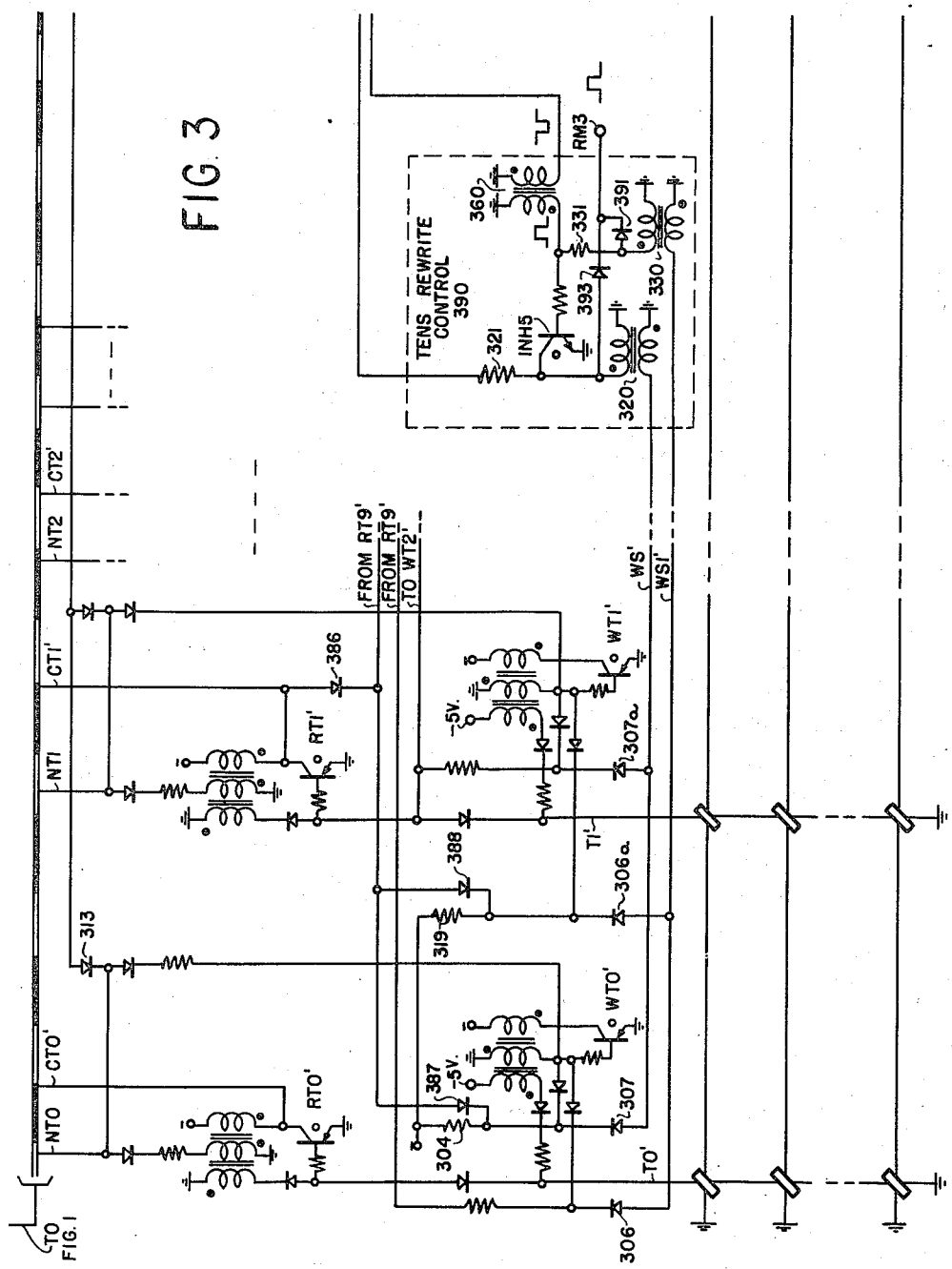
INVENTOR.
ALFRED H. FAULKNER
BY
ATTY.

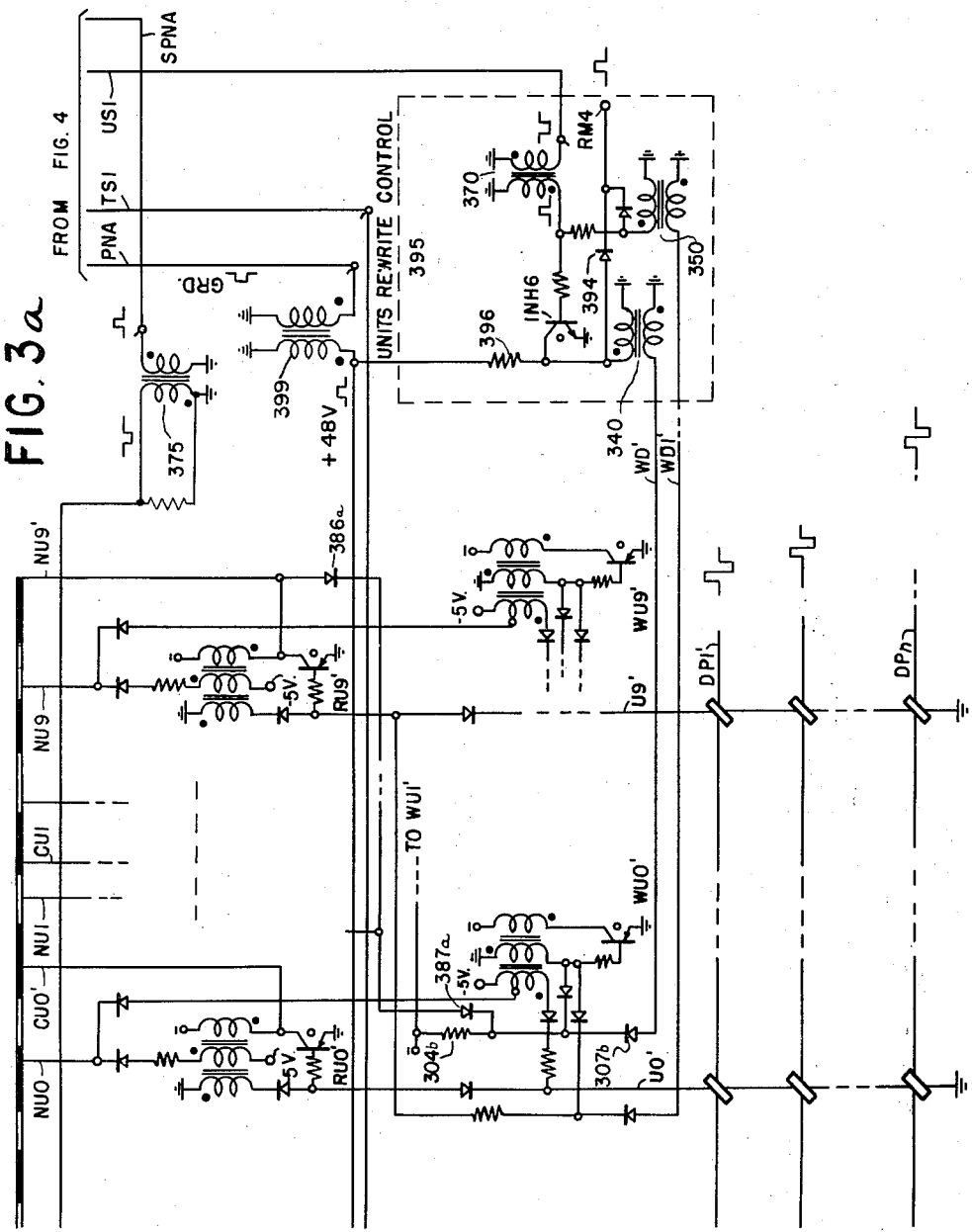

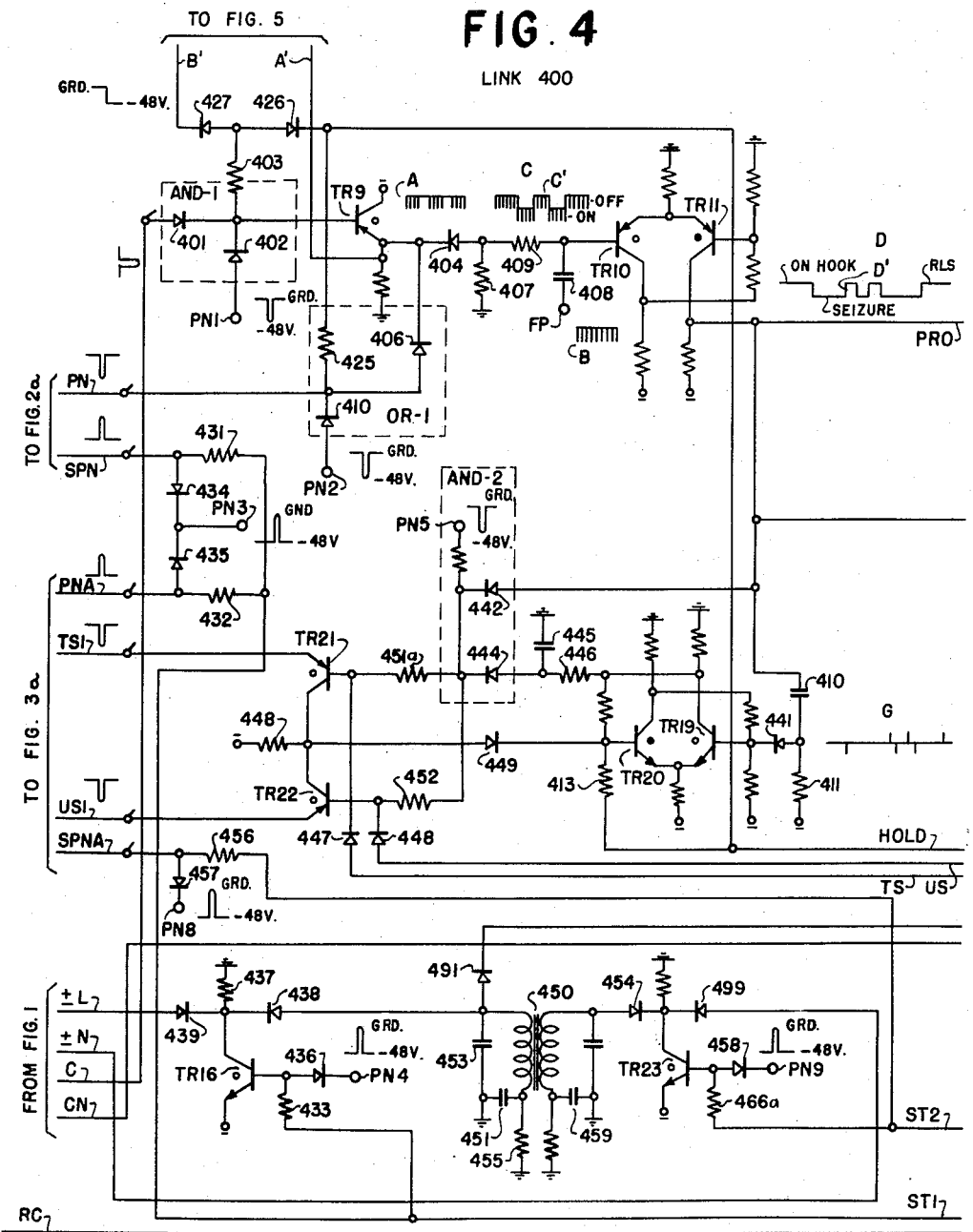

Sept. 30, 1958 A. H. FAULKNER 2,854,516
ELECTRONIC TELEPHONE SYSTEM
Filed Nov. 23, 1955 9 Sheets-Sheet 7

INVENTOR.
ALFRED H. FAULKNER
BY
ATTY.

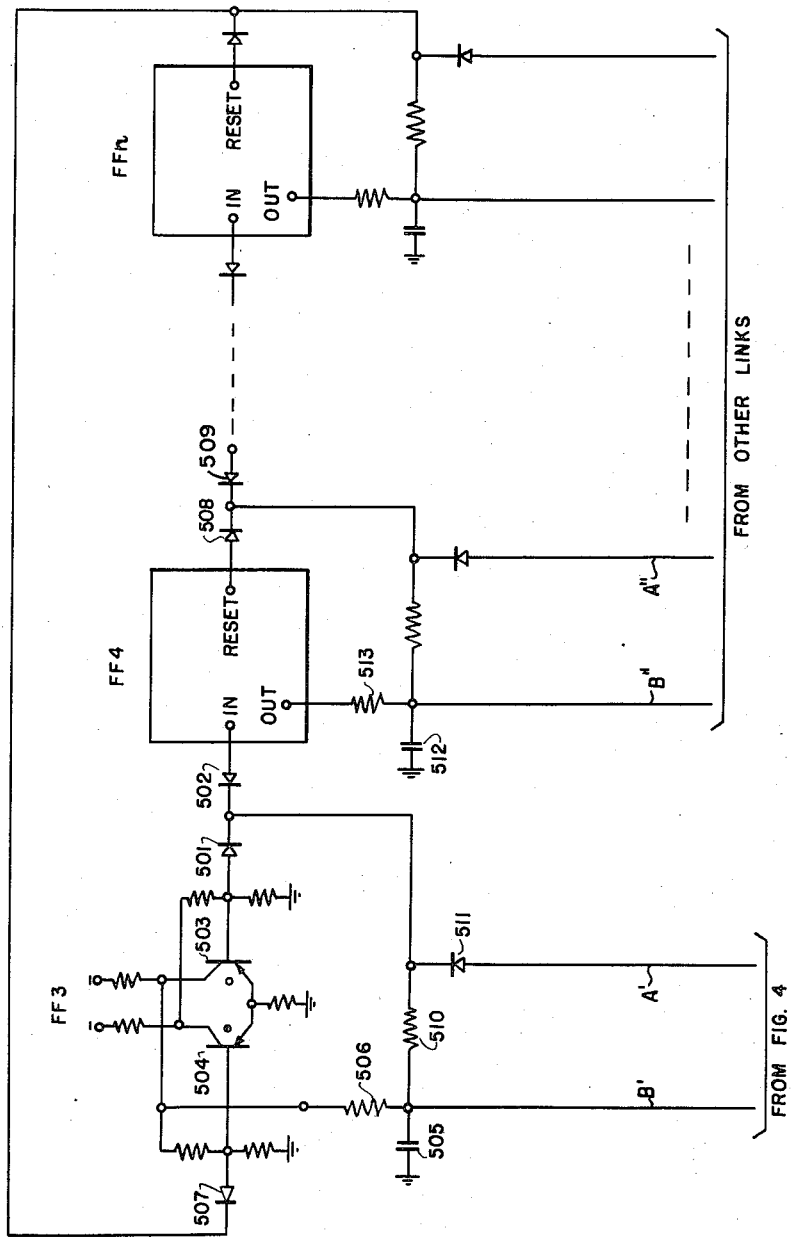

Sept. 30, 1958  A. H. FAULKNER  2,854,516
ELECTRONIC TELEPHONE SYSTEM
Filed Nov. 23, 1955  9 Sheets-Sheet 9

SEQUENCE SWITCH 600

INVENTOR.
ALFRED H. FAULKNER
BY
ATTY.

United States Patent Office 2,854,516
Patented Sept. 30, 1958

2,854,516

ELECTRONIC TELEPHONE SYSTEM

Alfred H. Faulkner, Chicago, Ill., assignor to General Telephone Laboratories, Incorporated, a corporation of Delaware Application November 23, 1955, Serial No. 548,611

42 Claims. (Cl. 179—18)

This invention relates in general to a communication system and more particularly relates to an electronic telephone system wherein a call from one station to another is established and maintained with the use of certain equipment common to a plurality of stations, and which can be utilized repeatedly during the time a call from the one station is in progress to extend connections between other stations of the plurality.

In the usual telephone system wherein a number of calling and called stations are provided, certain equipment common to the stations is utilized for establishing and maintaining a call from one calling station to a called station, and that equipment is thereafter not accessible to another calling station for extending a connection during the time the call is in progress. Another calling station must therefore utilize certain other common equipment accessible to it during that time interval for establishing a connection to a called line. This leads to the extensive duplication of the common equipment for the purpose of enabling many calling stations to extend respective connections during a given time interval.

The common equipment just referred to, generally comprises a number of individual switches of various types grouped to form switch trains individual to a calling and called line during a call. Thus a switch train may comprise a finder switch or line finder for finding a calling line, one or more selector switches for extending the connection and a connector switch for completing the connection to the called line. In large systems a so called finder-selector link arrangement is first associated with the called line, but in small systems a finder-connector link is all that is used. In whatever arrangement the switches are used, each must be provided with an expensive selecting arrangement so that it may be properly positioned for performing its function in establishing and maintaining a call, and as many of each types of switch must be provided as will meet the normal traffic requirements of the system.

The present invention eliminates the problem of duplicating the expensive selecting arrangement for each switch to permit a plurality of simultaneous calls to be established utilizing a common selecting arrangement. This is done by assigning an individual portion of a time interval to each calling station or line, during which portion, the common selecting arrangement is effective to establish a call and thereafter maintain it while continuing to be available to establish and maintain other calls. Specifically a number of electronic links somewhat analogous to those mentioned above all use a common signal transmission path to the stations. Each link has memory incorporated in the finder portion thereof, which is scanned in a time or scanning period individual thereto. The finder memory of each link in turn scans one line at a time during its individual time period or portion by means of certain common selecting circuits. Each memory is scanned in sequence so that all the memories are scanned once in an entire scanning cycle, and each memory is normally advanced one position during its scanning period so that it scans a succeeding line during its scanning period in the succeeding scanning cycle. When a line initiates a call and is thereafter scanned by a link memory, that link and time period are made individual to the calling line for the duration of the call under control of the common circuits, and the memory. The calling line is then scanned once in every scanning cycle by the same link memory during the scanning period of that link. Other links continue to scan the lines by means of the common circuits and on a call from another line a connection is also established therefrom under the control of the common circuits.

The links just mentioned above are somewhat comparable to a finder-connector link in the usual 100-line telephone system, as that is the size of the system illustrated herein. The principles of operation are just as applicable to a larger system such as that wherein a finder-selector link is first utilized to extend a connection either directly to a connector or over one or more succeeding selectors to a connector and then to the called line. A link in this case may therefore be defined as an arrangement accessible to one of a number of terminals for extending a connection from any one thereof. The connector portion of the link also has an individual memory which is scanned in the same time or scanning periods as the finder portion. In response to dial pulses transmitted through the link to other common selecting circuits the called line is scanned in those time periods under the control of the other common circuits and the connector memory for the purpose of completing the call.

On answer by the called party both the calling and called stations are connected over the link under control of the common circuits and the link memories. The connection is continuously rendered effective during the time or scanning period of each scanning cycle assigned thereto. As the scanning is done electronically it is extremely rapid and therefore the assigned time periods occur so frequently as to simulate a continuous effective connection. Other calls are also continuously being established to other called lines under control of the common selecting circuits during the individual time intervals assigned to other links. Thus each link is reduced merely to an inexpensive memory for setting the common selecting circuits during each scanning period and to equipment for dial pulse and speech transmission and for performing certain supervisory functions. In addition to the above described novel arrangement many features for accomplishing the above and other objects will be apparent on perusal of the following specification, claims and drawings.

Fig. 1 discloses the essential elements of the type of line circuit used in the present invention. The station circuit which includes hookswitch springs 2 and ringer 3 is indicated by the circle circumscribing the digit 5. It is of any well-known type and is connected to the line circuit over the +L and —L conductors in any well-known manner.

Figs. 2 and 2a disclose the common selecting circuits used for line finder scanning of the line circuits. At the bottom of Figs. 2 and 2a are indicated a portion of the respective magnetic or ferrite core memories used for each line finder portion of the links, and which are scanned sequentially for enabling the line finders to scan the line circuits. Fig. 2b is arranged to convey the appearance of the actual cores and the manner in which they are physically disposed with respect to each other and the associated leads.

Figs. 3 and 3a disclose the common selecting circuits used for the connector scanning of the called line circuits. Likewise at the bottom are indicated a portion of the respective connector magnetic or ferrite core memories which are scanned simultaneously with the scanning of the associated respective line finder memories.

Figs. 4 and 4a disclose the essential details of the speech and pulse transmission circuits and the supervisory circuits of one finder-connector link 400. Each link is considered as including a finder portion and a connector portion. The finder portion of link 400 will be referred to as finder 1 or line finder 1 in the following specification.

Figure 6:
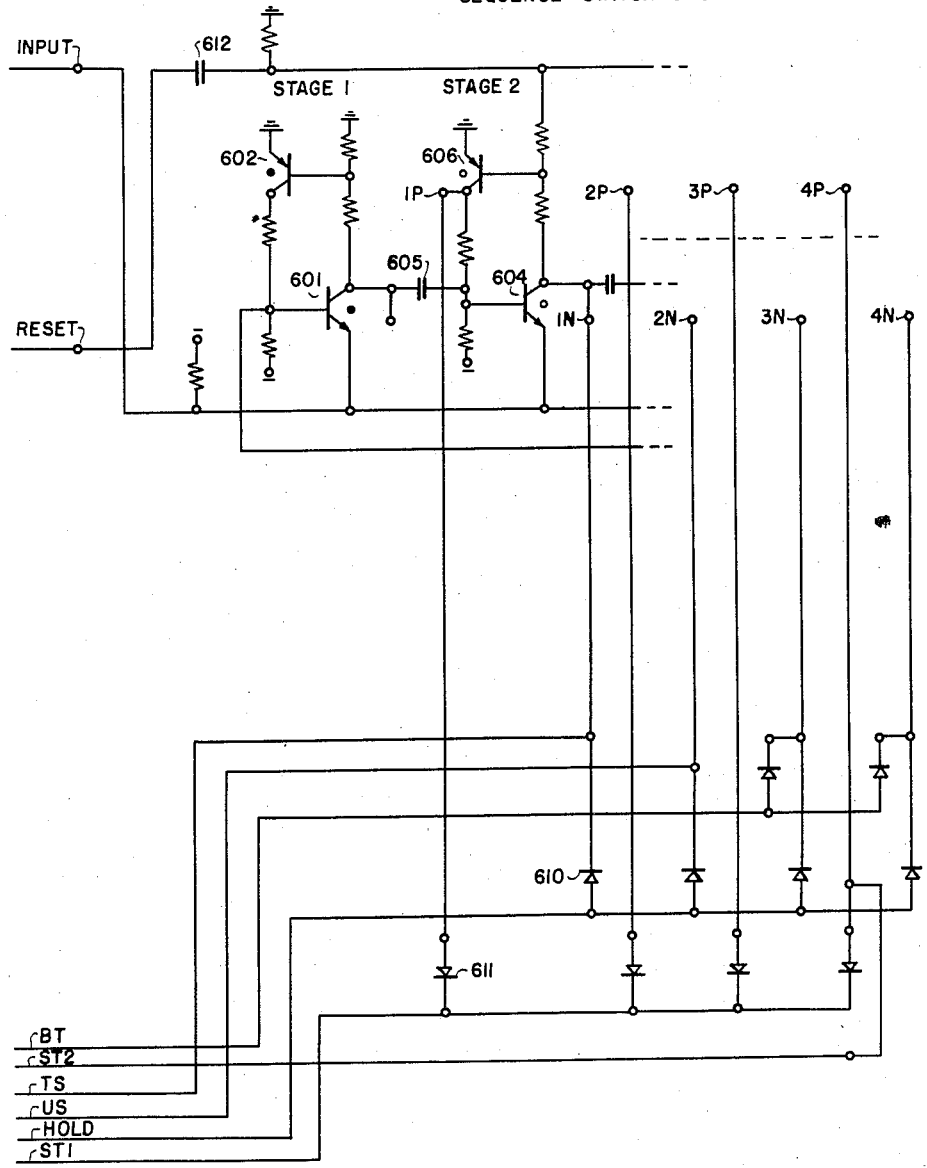

Fig. 5 discloses the Allotter 500 utilized for selecting idle links, while Fig. 6 illustrates the Sequence Switch 600 utilized with each link.

Beneath the common selecting circuits shown in Figs. 2 and 2a are shown a series of horizontal leads DP1–DP$n$ individually corresponding to each line finder or link. Each lead has connected thereto a memory comprising a series of ferrite cores. An example of the use of a ferrite core memory may be found on pages 146–149 of an article entitled "Ferrites speed digital computers," by David K. Brown and Ernst Albers-Schoenberg, in the periodical entitled "Electronics," published April 1953. In this article the ferrite cores are described as torroids each having two different states of remanent magnetization defined as the one and zero states respectively. Actually the cores are rings of ferrite material arranged with leads extending therethrough, and if necessary also wound on the rings. The ferrite cores are arranged in a coordinate array having a number of rows and columns. In that arrangement a core is set in one of the two states by the concurrent application of a current pulse of an amplitude arbitrarily assigned a value of $+Im/2$ (hereinafter called a half write pulse) to one row and one column respectively. This sets or changes the state of remanent magnetization to state one in the core at the cross point of the row and column. The other cores are unaffected and remain in the other or zero state. By applying concurrent current pulses of amplitude $-Im/2$ (called read pulses) to the same row and column a large change in the flux of the core at the cross point is occasioned, and it returns to the zero state. An output lead is threaded through every core, and a read-out or an output voltage is obtained thereon as a result of the large change in flux in the core to which the read pulses are applied. As any core which is in the zero state produces only a small change in flux in response to the read pulses an ineffective output voltage is provided therefrom, which is clearly distinguishable from the aforementioned read-out or output voltage. Reading out leaves the selected core in the zero state so that rewriting is necessary to provide another output voltage. This is accomplished by applying coincident half write current pulses of amplitude $+Im/2$ to a row and a column to set or store information in the same core or a new core if desired.

In the present memory arrangement only one input or read pulse need be used for each memory to secure an output from a core as the cores are arranged in a linear array on each DP lead. It will hereinafter be called a read pulse, and its amplitude is therefore equal to $Im$, but it is arbitrarily chosen to be of opposite polarity to that described above. The polarities of the output pulses are therefore arranged in the instant case to be the opposite of that shown in Fig. 1 of the aforementioned article. Thus the one and zero states of the cores in the present arrangement might be considered the reverse of that described in the aforementioned article, however this is immaterial as the principle of the ferrite core operation is the same. Any core which is in state one, as considered in the present arrangement, will hereinafter be spoken of as set. As the read pulse does not reverse the state of a core which has not been set it may be of greater amplitude than $Im$ without disturbing the unset cores. On the occurrence of a read pulse any set cores in the array provide an output pulse along a lead which may later be used to supply a half write pulse thereto. The initial state of remanent magnetization is of course reversed. The pulses applied to set or store information in the cores are called half write pulses as two are necessary to set or store information in a particular core. Their amplitude is each $Im/2$, but they are of negative polarity to reverse the state of a core containing no information. As each half write pulse might change the state of a core if it were of high enough amplitude, they are each assigned a value of $Im/2$ so that only the core to which they are both applied is set.

In the 100-line system illustrated herein twenty cores are provided on each DP lead shown in Fig. 2. Ten of the cores individually correspond to different tens digits and ten individually correspond to different units digits. Therefore, if one core in the tens group and one core in the units group is arranged in a state of remanent magnetization different than the others or in other words are set to one, output pulses corresponding to one line are provided, on the application to the DP lead of a read pulse, which reverses the state of remanent magnetization of the two cores. The particular cores which provide the output pulses are determined by which have been set by a previous half write pulse on a DP lead and respective half write pulses returned from the common selecting circuits. As a memory for use in the present invention may be any arrangement which will assume a condition corresponding to a previously applied electrical condition, and will provide an electrical output corresponding to the assumed condition on the application thereto of a succeeding electrical condition, it will be understood that many other well-known types of memory arrangements, such as recirculating delay lines, magnetic drums, or ferro-electric arrays, may be used instead of ferrite cores to provide similar results.

Each DP lead corresponds to one link and is assigned an individual time or scanning period during which pulses are provided at desired times in that period to various portions of each link and to the Rewrite Controls in the finder and connector common selecting circuits, from a pulse generator (not shown) or from what is commonly known in the computer art as a "clock." Thus a read and a half write pulse of a predetermined duration are applied sequentially to lead DP1 to scan lead DP1 in the particular time or scanning period assigned to line finder 1 or link 400 and similar successive read and half write pulses are applied to leads DP2–DP$n$ in the individually corresponding time periods assigned thereto. Likewise clock pulses of a predetermined duration are applied at terminals such as PN1–PN9 shown in Figs. 4 and 4a of each link during the scanning period individual to the link. The time interval between successive read pulses on any one DP lead is a scanning cycle and all DP leads in the group are scanned once before any one lead is scanned again.

Whenever a core is changed from a remanent magnetization of state one to the zero state as a result of a read pulse along its DP lead, it provides an output pulse over the individually corresponding output lead (T1–T0, U1–U0) for scanning the line circuit assigned a corresponding digit value. As the output pulses of the cores are of insufficient amplitude or power capability to provide the desired line scanning, each is used only to trigger a read blocking oscillator assigned the same digit value in the common selecting circuits. The power of the output pulses may of course be varied by the number of turns around the cores to ensure that a pulse of the correct value is applied to the blocking oscillators.

The respective pulses from the set tens and units core are respectively applied to the individually corresponding one of the tens read blocking oscillators RT1–RT0 and to the individually corresponding one of the units read blocking oscillators RU1–RU0 respectively. These in turn each provide several respective output pulses of a predetermined duration. One of the output pulses from each blocking oscillator is applied to the line circuits having the corresponding digit value over leads such as CT1 and CU1 shown extending to Fig. 1. A gate at the line circuit assigned both the tens digit value and the units digit value corresponding to the oscillators providing the output pulses is then opened to permit that line to extend a call. Another of the output pulses from each oscillator is returned to write oscillators WT1–WT0 and WU1–WU0 respectively, assigned the same and the succeeding digit value. The returned pulse from the tens read oscillator is normally effective at the write oscillator assigned the same digit value under control of the Tens Rewrite Control 190, while the returned pulse from the units read oscillator is normally effective at the write oscillator assigned a succeeding digit value under control of the Units Rewrite Control 195.

The respective write oscillators at which the pulse from the respective read oscillators are effective, provides several output pulses of a predetermined duration. One pulse from both the tens and units write oscillators is returned along the individually corresponding lead T1–T0 and U1–U0 respectively to set a core on the DP lead of the scanning line finder. The pulse from each write oscillator is a half write pulse and is applied in synchronism with the half write pulse along the DP lead of the line finder which is scanning, to set the cores assigned the digit value individually corresponding to the write oscillators providing the pulses, to state one. As previously explained each units read oscillator returns a pulse which is effective at the write oscillator assigned a succeeding digit value and therefore the core assigned a succeeding digit value of the scanning line finder is set. The next read pulse along the DP lead of that line finder will therefore result in scanning the line circuit assigned a succeeding digit value. When the units read oscillator RU0 is controlled to provide a pulse, thereby indicating that all line circuits in a particular tens group have been scanned, a tens write oscillator assigned a succeeding digit value is controlled by the Tens Rewrite Control 190 and the pulse returned from the preceding tens read oscillator sets a core having a succeeding tens digit value. In this manner each line finder normally scans a succeeding line circuit during each scanning period assigned thereto by advancing the individual memory to a succeeding position. The scanning period is substantially 10 microseconds long so that if X line finders are provided in a group the total scanning cycle is 10X microseconds. Because of the rapidity within which a scanning cycle may be completed no line need wait long before being scanned, and the number of line finders may be easily varied without complicating traffic problems.

The Tens and Units Rewrite Controls 190 and 195 respectively determine which write oscillator of the tens and units group are controlled by a pulse from a read oscillator. The rewrite controls are under control of a clock pulse which changes terminals RM1 and RM2 from ground potential to a positive potential after the start of a read pulse on each DP lead and returns these terminals to ground potential at the end of the read pulse. This enables leads WS and WD1 to be pulsed for controlling the write oscillators to provide the desired sequential line circuit scanning. When a line initiates a call and is scanned, the link which is scanning will thereafter control the rewrite controls during its scanning period to ensure that the link memory is set to the same position during its scanning period under control of leads WS and WD. This causes that link to scan the same line during each succeeding scanning period of the succeeding cycles.

Referring to Fig. 1 it will be seen that the calling condition provided at the gate of a calling line is effective, when the gate is opened by the respective pulses applied thereto over leads such as CT1 and CU1 from the tens and units read oscillators assigned the same digit value to control the transistors TR3 and TR4 connected in common to all the line circuits and to all the links over the common C lead. They give rise to a pulse, which is applied over the C lead connected in common between all the links. This pulse is only effective at the link corresponding to the scanning line finder as another pulse is simultaneously applied thereat from the clock. The pulses are applied to a gate such as AND–1 shown in Fig. 4 at the scanning link only and if the Allotter 500 is providing a negative volt potential to this gate, the link is seized. Although the negative potential just referred to is somewhat above −48 volts, it and other potentials will be hereinafter referred to in several instances as −48 volts, for the reason, that the present invention is designed with reference to the common telephone usage of 48 volt battery. Therefore, reference to −48 volts in such instances is believed to simplify and clarify the operation of the present invention. A pulse is returned over lead PN to the common selecting circuits in Figs. 2 and 2a under control of a circuit such as OR–1 to control the Tens and Units Rewrite Controls 190 and 195 respectively in synchronism with the pulses applied at RM1 and RM2. The rewrite controls now cause the pulse returned from the read oscillators corresponding to the calling line to control the write oscillators assigned the same digit value by pulsing leads WS and WD. The write oscillators in turn set the cores, assigned the same digit value as the calling line, of the line finder that scanned that line in conjunction with a half write pulse on the DP lead. This procedure occurs each time the line finder scans the calling line so that it will continue to scan the calling line on each read pulse occurring along its DP lead, as long as the call is in progress.

The pulse applied over the C lead to the scanning link activates transistor TR9 (Fig. 4), which initiates seizure of the link. After a suitable delay transistor TR15 is rendered conductive in a manner to be described, and it in turn provides a pulse for advancing the Sequence Switch 600 to its first position where it applies −48 volts to the Hold lead to eliminate the need for the allotter potential. The Allotter 500 comprises a chain of flip flops individually corresponding to each link and arranged to be advanced sequentially for providing the potential for controlling a gate such as AND–1 at the corresponding links. The allotter is also provided with a delay arrangement that corresponds to the delay provided for operating Switch 600, and it now advances to another link. In the meantime transistor TR17 is rendered conductive to extinguish TR18, which is normally providing pulses for retaining Sequence Switch 600 and flip flops FF1 and FF2 in their unoperated condition. A delay circuit associated with TR18 prevents it from becoming conductive when TR17 extinguishes during dial pulses in a manner that will be explained. Thus TR18 is again rendered conductive only on termination of the call to reset the Sequence Switch and flip flops FF1 and FF2 to their unoperated condition.

Other finders may have scanned the calling line and have gone through the same procedure if the allotter operation were not provided, but th eone which would extend the connection is the one whose sequence switch operates first as will be explained. Thus the allotter although not necessary to the functioning of the invention is useful to prevent the uneven use of the links and permits a call to be released in the event of a fault condition and be reinstated utilizing another link. The Sequence Switch 600, which is individual to the link, comprises a number of flip flops of the type illustrated in Fig. 6, and it is advanced to different positions for providing required potentials as will be described.

The transmission circuit is of the type disclosed in application Ser. No. 530,085 filed by Faulkner on August 3, 1955, with certain modifications adapted for the purposes of this invention. It includes lead ±L which is connected in common to a repeating coil such as 450 at all the links and to a repeating coil such as 50 at all the line circuits. It is effectively closed between the calling line and the seized link only during the scanning period of that link, by the pulses from the read oscillators, and is held closed for an additional period by pulses from the write oscillators. The transmission circuit closing pulses are ineffective until the link is seized, and the Sequence Switch 600 provides ground potential to lead ST1 so that in conjunction with a clock pulse at PN3 a pulse is provided over lead SPN during the link scanning period. The respective pulses from the tens and units oscillators are each applied over leads such as LT1 and LU1 to a number of transmission circuits. But only at the circuit corresponding to the tens and units value of the respective conductive oscillators is the circuit closed in conjunction with a clock pulse at PN4 in the link and ground potential applied to lead ST1 by Switch 600. An arrangement comprising transistors TR1 and TR2 (Fig. 1) is adapted to the transmission circuit for the purpose of now applying the non-calling condition to the line circuit gate during periods when the seized link is not scanning. This prevents another link from now receiving a calling line indication and completing the seizure procedure in the event it scans the calling line.

The seized link also prepares the connector common selecting circuits shown in Figs. 3 and 3a by providing a pulse during its scanning periods over lead PNA. These selecting circuits are arranged in a manner somewhat similar to the finder common selecting circuits. That is a number of tens read blocking oscillators, RT0'–RT1' and units read blocking oscillators RU0'–RU1' and corresponding write blocking oscillators WT0'–WT1' and WU0'–WU1' are provided. A linear array of cores are provided for each connector memory, which are scanned by read pulses along the corresponding DP' lead in a time period corresponding to the corresponding line finder scanning.

Dial pulses are transmitted to the seized link over the common C lead during the periods when the line circuit is scanned by the line finder cores and the associated common selecting circuits. Transistor TR9 is controlled thereby to in turn enable control of a pulse repeating arrangement in the link, and also to control the Sequence Switch 600. The impulse repeating arrangement in the link includes transistors TR19 and TR20 and gate AND–2 for controlling transistors TR21 and TR22 respectively in response to the dialing of the tens and units digits. Transistor TR21 tranmits the pulses corresponding to the dialed tens digit to the Tens Rewrite Control 390 (Fig. 3) over lead TS1 and thereafter TR22 transmits the pulses corresponding to the units digit to the Unit Rewrite Control 395 of the connector common selecting circuits over lead US1. These pulses in turn control the Tens and Units Rewrite Controls 390 and 395 (Figs. 3 and 3a) respectively, on each successive tens and units pulse, to set the cores corresponding thereto in conjunction with a half write pulse on the DP' lead corresponding to the scanning link. Thus on each successive tens pulse the connector tens cores are advanced one position and on each successive units pulse the units cores are advanced one position. After both digits are dialed and the tens and units cores of the link are set by the last controlled tens and units write oscillators, respectively, each read pulse along the corresponding DP' conductor continues to cause these cores to control the tens and units read blocking oscillators assigned the same digit value. These in turn control a gate at the called line over leads such as CT2' and CU1' during the same period that the calling line is scanned, and also return a pulse for controlling the corresponding write oscillators in the connector common selecting circuits. The corresponding write oscillators in turn continue to set the same cores. Thus the called line circuit is scanned on each read pulse applied to the DP' lead of the scanning link as long as the call continues.

The Sequence Swith 600 is now advanced to provide a —48 volt step to lead BT shown in Fig. 4a to perform a busy test of the called line during the scanning period. If the called line is busy, when the connector read oscillators open the gate at the called line, a pulse is returned over lead CN which is connected in common to all the links and line circuits. The pulse is only effective at the testing link during its scanning period to permit the —48 volts applied to BT to operate flip flop FF1. A busy tone is then returned over the open calling end of the transmission circuit under control of FF1. The —48 volts on BT also operates flip flop FF2 but it is rendered ineffective by operated flip flop FF1.

If the called line is idle, flip flop FF1 fails to operate immediately and FF2 is effective to control the Ringing Amplifier 495 through a delay circuit and gate AND–3, and it in turn enables ringing current to be applied to the called line. The called end of the transmission circuit is also closed by the Sequence Switch changing lead ST2 from —48 volts to ground potential and a ring back signal is provided to the calling party.

When the called line answers flip flop FF1 is operated to return flip flop FF2 to its non-operated condition and in turn cut off Ringing Amplifier 495 and the ringing current. The called end of the transmission circuit includes the ±N lead connected to a respective coil such as 50 at all the stations and to a repeating coil such as 450 at all the links. It is effectively closed by pulses applied by the read and write connector blocking oscillators to leads such as NT2 and NU1 in a manner similar to the calling end of the transmission circuit. As the two transmission circuits can now effectively transmit voice currents across coil 450 during the link scanning period the conversation may proceed.

On release of the connection of course either before or after the call is completed the idle or non-calling condition is returned to the C lead. Termination by the called party has no effect beyond returning the gate at his line circuit to the idle condition. Returning the C lead to the non-calling condition by the calling line deactivates TR9. Transistor TR17 is then extinguished to allow oscillator TR18 to conduct and it sends a train of pulses for resetting the Sequence Switch 600 and flip flops FF1 and FF2, if either has been operated.

It will be understood that the foregoing was intended to give a brief description of the manner of operation of the present invention which will now be explained in detail. Any specific potentials, circuit conditions or pulse time, etc., referred to herein are purely by way of example as these are subject to variations as required by the design requirements of the system. To indicate the normal state of certain transistors used in the present invention two symbols are employed. A black dot indicates a normally conductive state, while an empty circle indicates a normally non-conductive state. Both PNP and NPN type transistors are used in the present invention. The first is indicated by an arrow in the emitter circuit pointing toward the transistor, while the NPN type transistors are indicated by an arrow in the emitter circuit pointing away from the transistor.

Line finder scanning

The cores of the memory of the first line finder as shown in Figs. 2 and 2a are pulsed over lead DP1 by a read pulse of 5 microseconds. It is followed by a 5 microsecond half write pulse of opposite polarity and half the amplitude of the read pulse. The DP1 lead is therefore pulsed by a read and half write pulse once every 100 microseconds or one scanning cycle in a ten line finder group as is every other DP lead. Assuming the ferrite cores connected to leads T1 and U1 and lead DP1 have been set by the combination of a previous half write pulse on lead DP1 and a positive pulse on leads T1 and U1 respectively in a manner which will be explained, the succeeding read pulse over lead DP1 causes these ferrite cores to produce a negative pulse on conductors T1 and U1 respectively. The pulses may vary between 1 and 5 microseconds in length depending on the type of core employed. The pulse on T1 passes through rectifier 105 and is applied to the base circuit of transistor RT1 through resistor 101, while the pulse along lead U1 is passed through rectifier 105b and applied to the base circuit of transistor RU1 through resistor 101b. The respective pulses on leads T1 and U1 are blocked from windings A3 and E3 respectively by rectifiers 139 and 139a respectively. Transistors RT1 and RU1 in the common selecting circuits are each arranged as blocking oscillators, and each is rendered conductive as a result of the negative pulse applied to their respective base circuits.

A positive pulse is applied by the clock to the Tens Rewrite Control 190 and the Units Rewrite Control 195 at RM1 and RM2 respectively. These pulses are synchronized to start substantially 3 microseconds after the start of the read pulse on any DP lead, and each ends substantially simultaneously with the end of the read pulse on the DP lead. The ground normally at RM1 is applied to one side of rectifiers 191 and 192 respectively to shunt any positive potential on the respective other sides, while the ground normally at RM2 does the same at rectifiers 193 and 194 respectively. As the respective other sides of rectifiers 191 and 194 are each respectively at ground potential through the transformers 130 and 140 respectively connected thereto, these transformers are normally unaffected by a positive pulse at RM1 and RM2 respectively. The other side of rectifier 192 however, is connected to positive potential through resistor 133, and as the rectifier is not able to shunt that potential during a pulse at RM1, current then flows through the primary of transformer 120. Because of a similar connection to positive potential at rectifier 193, current also flows through the primary of transformer 150 during a pulse at RM2. The secondaries of the respective transformers 120 and 150 are each arranged to provide a negative pulse along leads WS and WD1 respectively as a result of the voltage induced therein by the current flow in their respective primaries. The negative pulse on the lead WS blocks rectifiers 107 and 107a to a negative potential on their respective other sides. It does the same at all the corresponding rectifiers (not shown) connected thereto from other WT circuits (not shown). The negative pulse along WD1 blocks rectifiers 106b and 106c and all the corresponding rectifiers (not shown) connected to other WU circuits (not shown) in a similar manner.

The negative pulse applied through rectifier 105 to RT1, is also incidentally applied across several other multiple paths including resistor 104 to rectifiers 107 and 109, and over resistor 119 to rectifiers 106a and 110a. Before the blocking negative potential appears at the lower end of rectifier 107 the pulse is substantially shunted over leads WS and WS1 respectively and the respective low impedance secondary winding of transformers 120 and 130 to render rectifiers 109 and 110a ineffective to pass the pulse. This initially prevents either of the respective transistors WT1 or WT2 from becoming conductive. These transistors are also each arranged as blocking oscillators. Isolating resistors 104 and 119 respectively act to prevent the pulse from being shunted from the base circuit of transistor RT1.

In the meantime transistor RT1 has been rendered conductive by the negative pulse along conductor T1, and current flows between its collector and emitter circuits. Lead CT1 connected to the collector circuit swings from —48 volts to substantially ground potential to apply that potential to all line circuits whose tens digit is one. At the line circuit 11, the ground potential conditions the rectifier 25 accordingly, and at all other line circuits whose tens digit is one the rectifier corresponding to rectifier 25 is also conditioned accordingly by the ground potential. As soon as current flows through winding A1, a voltage is induced across windings A2 and A3 respectively. These voltages are substantially greater than the original pulse on lead T1, but are only a fraction of the amplitude of the pulse on CT1. The current through A1 increases linearly with time and eventually reaches the maximum value that the collector of RT1 is capable of supplying, which depends on the circuit constants. At this point the voltage across windings A1, A2 and A3 and the voltage on the respective leads connected thereto falls back to its original value. The upper end of winding A2 swings negative in response to the increasing current through A1, and a corresponding potential is applied through resistor 159 to rectifier 112, but is substantially shunted from lead LT1 to ground through rectifier 113 and the left winding of transformer 175 with the resistor in shunt therewith. The induced voltage across A3 gives rise to a negative pulse at the lower end of winding A3. It maintains the blocking oscillator RT1 conductive until the termination of the linear current rise in winding A3, at which time the base circuit of RT1 returns to its original value, and RT1 is cut off quickly. The lower end of winding A3 now swings positive because of the field collapse in A1, but rectifier 139 prevents that swing from being passed over lead T1 and affecting any core or circuit associated therewith. With this arrangement RT1 is maintained conductive for about 5 microseconds from the start of the read pulse on lead DP1 to provide the described pulses for substantially the same period to its associated leads.

The negative pulse derived at the lower end of winding A3 passes through rectifier 139 and is applied to resistors 104 and 119 in multiple. It is blocked from lead T1 by rectifier 105. From resistor 119 a path for this pulse extends through rectifier 106a, lead WS1 and the lower winding of transformer 130 to ground. Rectifier 110a connected between 119 and 106a is shunted by the low impedance path through 106a and the lower winding of 130. Rectifier 109 is similarly shunted through 107 to WS initially, but during a pulse at RH1, rectifier 107 is blocked by the negative swing on the WS lead, and therefore the pulse through resistor 104 is applied through rectifier 109 to the base circuit of the transistor WT1, which now conducts. Isolating resistor 119 prevents the pulse from being shunted over the just described low impedance path. Current therefore flows in winding B1 connected to the collector circuit of WT1, and a voltage is induced across windings B2 and B3. A negative pulse is derived at the lower end of winding B2, and that pulse is blocked by rectifiers 109 and 110. It is applied to resistor 125 and rectifier 111, but is shunted from lead LT1 by rectifier 113 and the left winding of transformer 175 with the resistor in shunt therewith. This pulse is also applied to the base circuit of WT1 through a resistor to hold WT1 conductive. A positive voltage is derived at the lower end of winding B3, and it is passed through rectifier 108 and the resistor 102 to the T1 lead, where it in conjunction with the half write pulse concurrently applied to lead DP1 resets the core connected to lead T1 and lead DP1. Another read pulse on lead DP1 will therefore result in scanning the same tens group of line circuits through the common selecting circuits.

Transistor WT1 is maintained conductive until the current through winding B1 reaches a constant value at which time the voltage across winding B2 falls and WT1 is cut off. The WT1 transistor is rendered conductive before RT1 is cut off and is held conductive for a period of about 5 microseconds. WT1 starts conducting substantially 3 microseconds after RT1 to give a combined scanning pulse or period of about 8 microseconds with about a 2 microseconds spacing interval. The 8 microsecond scanning pulse is applied over lead LT1, when a pulse is applied along lead SPN as will be explained, to maintain rectifier 113 blocked to the negative pulse appearing at rectifier 112 and rectifier 111 respectively. The periods that the oscillators are held conductive is of course determined by the circuit constants of each and may be varied to suit the particular needs of the system. In this system the total scanning period (scanning pulse plus spacing interval) is described as 10 microseconds and each oscillator in the common selecting circuits operates in a manner above described. The positive pulse derived from winding B3 therefore substantially coincides with the half write pulse on lead DP1. As a substantially larger pulse is needed to affect a core than an oscillator, the resistor 104 is effective to prevent the positive swing, which occurs at the lower end of winding B2 on collapse of the field at B1 from affecting any core at T1, without substantially affecting the result of any pulse applied to the oscillator.

The negative pulse on lead U1 is passed through rectifier 105b to render blocking oscillator RU1 conductive at the same time as RT1. A multiple path is provided for that pulse through resistor 104b, rectifier 107b in shunt with rectifier 109b, which is connected to winding F2 and the base circuit of transistor WU1, and from rectifier 107b to the WD lead and ground through the lower winding of transformer 140. It is also transmitted through resistor 119c and rectifier 106c in shunt with 110c to ground through the lower winding of transformer 150. Rectifier 110c is connected to the base circuit of transistor WU2 and to winding H2 in a manner similar to the arrangement shown for rectifier 109b. Both are initially shunted by the low impedance path through the respective transformer windings of 150 and 140, while isolating resistors 104b and 119c prevent RU1 from being shunted in a manner similar to that explained for RT1.

When blocking oscillator RU1 conducts, the lower end of winding E1 swings from —48 volts to substantially ground potential. This potential is transmitted over lead CU1 and conditions the rectifier 26 in the line circuit 11 accordingly, and it also conditions a corresponding rectifier in all lines assigned units digit 1. It will be remembered that a similar potential or pulse is simultaneously applied over lead CT1 to rectifier 25 at line circuit 11. Thus at only the one line circuit, assigned the digits 11, are the two gating rectifiers 25 and 26 conditioned simultaneously. This controls a connection over the C lead to a link such as 400 during the first 5 microseconds of the scanning period corresponding to such link, to enable a call to proceed from line circuit 11 in a manner which will be explained. Substantially ground potential is derived at the upper end of winding E2 and it is passed over conductor LU1 through a resistor and rectifier 115. The negative voltage derived at the lower end of winding E3 on conduction by RU1 maintains the blocking oscillator RU1 conductive for a similar time period as RT1 so that pulses of the same duration are provided at the associated leads. The negative voltage is blocked from lead U1 by rectifier 105b and is passed through resistors 104b and 119c. From resistor 104b it is passed through rectifier 107b to lead WD and the lower winding of transformer 140 to ground to thereby shunt rectifier 109b and maintain WU1 cut off. The shunt path is blocked at rectifier 106c by the negative pulse subsequently appearing on lead WD1, and therefore current then passes through rectifier 110c to render transistor WU2 conductive. In this case resistor 104c is the isolating resistor which prevents the pulse from being shunted from rectifier 110c.

Current now flows in the winding H1 connected to the collector circuit of WU2. The lower end of winding H2 swings negative in response to voltage induced therein to hold WU2 conductive for a time period corresponding to WT1 in a similar manner. The tap on winding H3 swings from —5 volts to a more positive value or substantially ground potential. That potential is passed through rectifier 118 to conductor LU2, but serves no purpose at the present time. A more positive pulse at the lower end of winding H3 is passed through rectifier 108c and resistor 102c to conductor U2 concurrently with the half write pulse on line DP1. The core corresponding to the units digit 2 is therefore set. The next read pulse occurring along lead DP1 will therefore result in the common selecting circuits scanning the line circuit assigned the digits 12, as the tens core corresponding to one has been set and the units core corresponding to 2 has been set. In this manner each units core is set in succession to permit the scanning of each line in each tens group in succession.

When the units core corresponding to 0 has been set, and the succeeding read pulse over lead DP1 has resulted in rendering blocking oscillator RU0 conductive, a 5 microsecond positive pulse is derived at the upper end of winding Z2 as described for the corresponding winding E2. This pulse is applied to INH2 and is used to shift the Tens Rewrite Control 190 in a manner to be explained so that a succeeding group of ten line circuits will be scanned. A negative pulse derived at the lower end of winding Z3 of RU0 is passed through resistor 103b. It is blocked by the negative pulse applied from lead WD1 to the lower end of rectifier 106b to render WU1 conductive in a manner similar to that explained for WU2. A positive pulse is then transmitted through rectifier 108b, resistor 102b and over conductor U1 to set the units core as the half write pulse occurs on lead DP1, all in the same manner as explained for the setting of the core connected to U2. The negative pulse is also transmitted for no effect at this time through a resistor corresponding to 104b and a rectifier corresponding to 107b and associated with transistor WU0 (not shown) to ground through a low impedance path including lead WD and the lower winding of transformer 140. This permits the Units Rewrite Control to cause WU0 to be rendered conductive instead of WU1 in case lead WD is pulsed at the time RU0 is conductive.

The pulse transmitted from the upper end of winding Z2 to the base circuit INH2 is approximately ground potential. INH2 is rendered conductive as long as the 5 microsecond pulse from Z2 is applied, after which it returns to its original condition. The emitter circuit of INH2 swings positive to transmit a positive pulse through resistor 131 and also to the base circuit of INH1. As rectifier 191 is blocked by a positive pulse at RM1 several microseconds after the start of the pulse applied to resistor 131, current flows through the primary of transformer 130 for only that period, as the rectifier 191 is an effective shunt thereafter. This gives rise to a negative potential on lead WS1 in a manner explained. Simultaneously INH1 was rendered conductive by the positive potential applied to its base circuit thereby clamping the lower end of resistor 133 and the left end of the primary of transformer 120 at substantially ground potential. This prevents the occurrence of a negative pulse on lead WS. INH1 remains conductive only so long as INH2 is conductive and therefore it will return to its non-conductive condition in synchronism with the cessation of the pulse at RM1. Lead WS therefore remains at ground potential, while lead WS1 delivers a negative potential to the lower end of rectifiers 106, 106a and the corresponding rectifiers (not shown) connected to the WS1 lead. The negative pulse appearing between rectifiers 106a and 110a, as a result of RT1 becoming conductive, is therefore no longer shunted to ground, whereas the pulse appearing at rectifiers 107 remains so shunted at the secondary of transformer 120. Transistor WT1 remains cut off, while transistor WT2 becomes conductive in a manner already described for the corresponding transistors. Winding D1 therefore draws current, and a positive pulse is derived at the lower end of winding D3. It is passed through rectifier 108a and resistor 102a to the T2 lead. There in conjunction with the half write pulse on lead DP1 it sets the tens digit core connected to T2 and DP1 to enable line circuits in the corresponding tens group to be scanned in succession on succeeding read pulses along lead DP1.

If the last tens group corresponding to RT0 (not shown) was being scanned at the time that RU0 conducts to shift the Tens Rewrite Control 190 in the manner just explained, the negative pulse returned from RT0 through resistor 103 is effective to render WT1 conductive as rectifier 106 is blocked by the negative pulse appearing on lead WS1. WT0 (not shown) is shunted in a manner already explained for the corresponding transistors. The positive pulse derived at the lower end of winding B3 is therefore effective to set the first or one tens core connected to lead T1 and lead DP1.

Succeeding read and half write pulses on leads DP2–DPn and individual thereto result in reading out or scanning and setting respectively a tens and a units core of each line finder. A line circuit is therefore scanned during each individual line finder scanning period in each scanning cycle through the common selecting circuits in a manner just explained for line finder 1, and each line finder normally scans a succeeding line circuit in each successive scanning cycle.

*Initiation of a call*

Referring to Fig. 1 it will be seen that line circuit 11 normally has —48 volts connected through resistors 49 and 43 to the upper end of rectifiers 25 and 26. A —48 volt potential is also applied to the lower end of rectifiers 25 and 26 from windings A1 and E1 respectively, over leads CT1 and CU1 respectively, when the line circuit is not being scanned. Thus with the line idle and between scanning periods, junction 13 is approximately 48 volts negative as is junction 77. During the scanning periods, ground potential is applied to the lower end of rectifiers 25 and 26 from leads CT1 and CU1 respectively, but the potential at junction 13 remains at almost —48 volts because of the —48 volt battery supplied through resistors 49 and 43. If either the tens or units core assigned to this line circuit is being scanned, ground potential is applied to either lead CT1 or lead CU1, but as long as either one remains directly connected to —48 volts, junction 13 is kept at that voltage.

When a call is initiated from the station connected to line circuit 11 for example, the line loop through station 5 and including the +L and —L leads and the upper and lower left windings of repeating coil 50, is closed to ground and battery through resistors 48 and 49 respectively. The left ends of resistors 6 and 7 respectively are then raised to —40 volts but the junction 13 stays at —48 volts. When leads CT1 and CU1 swing to ground potential during the scanning period, as a result of RT1 and RU1 being conductive, the base circuit of transistor TR3 draws current from junction 13, through rectifier 27 and over the common connection. Current now flows in the collector circuit of TR3. The negative potential developed at the lower end of resistor 14, approximately —48 volts, is applied to the base circuit of TR4 connected as an emitter follower and it is cut off. The emitter circuit of TR3 is shown at exchange battery or —48 volts, however in practice the emitter may be given a slightly more positive value to prevent stray pulses from rendering TR3 conductive. A similar situation occurs if ground potential is applied to rectifiers 35 and 36 on a called line busy test as will be explained.

Assuming that an allotter has previously selected link 400 shown in Figs. 4 and 4, a potential close to —48 volts is conected to the junction of rectifiers 401 and 402 through rectifier 427 and resistor 403. This voltage is shunted from the base circuit of transistor TR9 over a multiple path to ground (not shown) at PN1 through rectifier 402 and over the common C lead to the emitter circuit of TR4. Transistor TR4 is therefore conductive whenever an idle line circuit is scanned. When the cores of line finder 1 are scanned by a read pulse over lead DP1, a simultaneous negative pulse of —48 volts is provided at PN1. With —48 volts applied at PN1 to the lower end of rectifier 402, the conductive transistor TR4 in Fig. 1 effectively maintains the junction of rectifiers 401 and 402 at substantially ground potential. Transistor TR9 remains non-conductive.

After a call is initiated and during the scanning period, when PN1 is at —48 volts and TR4 is cut off, as explained above, the C lead swings to —48 volts. The C lead is of course tied to the potential at the lower end of resistor 14 through the base and emitter circuits respectively, of TR4. That potential is now applied to the base circuit of transistor TR9. Between scanning periods the junction 13 in the line circuit 11 swings back to —48 volts to cut off TR3 and thereby render TR4 conductive to shunt the C lead to ground. During the periods when other line finders are scanning calling lines the action of TR3 and TR4 is as described above, however as —48 volts is only applied to resistor 403 of one link at a time by the allotter, the TR9 transistors in other links are not affected. If the allotter is not used, transistor TR4 may be cut off to render a transistor such as TR9 at another link conductive if that link is scanning a calling line.

The transistor TR9 conducts when the C lead swings to —48 volts, and its emitter circuit then swings from ground to nearly —48 volts. This potential is transmitted through rectifiers 404 and 406 in multiple and over lead A' to rectifier 511. Between scanning periods, the C lead swings back to ground potential as described, and TR9 is cut off. Transistor TR3 is rendered conductive each time line circuit 11 is scanned, and TR4 is therefore extinguished to return the C lead to substantially —48 volts. As the line finder 1 now scans the calling line periodically in a manner to be explained, transistor TR9 of link 400 is thus rendered conductive during each scanning period. Thus it gives rise to a series of negative pulses at its emitter circuit as shown in graph A. These pulses are supplied continuously to rectifiers 404 and 406, except for interruptions by dial pulses as will be explained. Capacitor 408 charges on each negative pulse through the low resistance 409 and discharges slowly through the high resistance 407. This forms a demodulating circuit which restores the D. C. component of the line current and establishes a steady voltage, following the envelope of graph A, which is applied to the base circuit of transistor TR10. TR10 and TR11 are connected in a trigger circuit arranged to switch "On" when the input is driven below a predetermined negative value and is switched "Off" when the input is driven above a smaller predetermined negative value. These triggering levels are indicated in graph C. The "On" condition occurs, when a negative impulse applied to the base circuit of TR10 in conjunction with the negative D. C. component resulting from the seizure condition drives the base circuit TR10 below the level marked "On" in graph C. The "Off" condition occurs, when the D. C. component applied to the base circuit of transistor TR10 rises above the level marked "Off" in graph C. Constantly being supplied to the base circuit of TR10 through capacitor 408 at the rate of one per scanning cycle of 100 microseconds in a ten link group is a series of approximately 5 microsecond negative framing pulses shown in graph B. They are of insufficient amplitude to trigger TR10 by themselves. The first framing pulse, applied at FP, which coincides with and is superimposed on the negative step derived through rectifier 404 exceeds the On level, and renders TR10 conductive. TR10 on becoming conductive causes TR11 to be cut off, and TR10 remains conductive between framing pulses. Lead PR0 connected to the collector circuit of TR11 swings from near ground potential to a steady —48 volts.

The negative pulse from the emitter circuit of TR9 is also transmitted through rectifier 406 over lead PN to the common selecting circuits for the purpose of causing the line finder 1 to continue to scan line 11 on each read pulse applied over lead DP1. A pulse of the same amplitude and polarity applied during the scanning period at PN2 prevents the pulse transmitted through 406 from being shunted at rectifier 410. The pulse on the PN lead causes a current change in the primary of transformer 185 shown in Fig. 2a to induce a voltage in its secondary. The lower end of the secondary swings sharply positive so that the base circuit of transistor INH3 in the Tens Rewrite Control 190 swings positive and the transistor conducts current. Its collector circuit swings negative to bias the base circuit of INH2 negative and prevent a pulse from the upper end of winding Z2 (which occurs when the calling line is in the X0 group) from affecting the Tens Rewrite Control Unit 190. Lead WS therefore continues to provide a negative blocking pulse to rectifier 107 during each scanning period and assuming the call was initiated at line circuit 11, continues to provide a pulse for resetting the core connected between leads T1 and DP1 so that RT1 and WT1 conduct in sequence on each read pulse. Likewise the positive pulse from the secondary of transformer 185 is applied over resistors 196 and 197 in multiple to the upper winding of transformer 140 as soon as the positive potential at RM2 is effective, and to the base circuit of transistor INH4 respectively. Transistor INH4 conducts and it shunts the positive potential at its collector circuit from transformer 150. Thus lead WD is provided with the aforedescribed blocking potential instead of lead WD1 as was done when the line finder is scanning sequentially. The negative pulse on lead WD blocks rectifier 107b so that transistor WU1 conducts instead of WU2 on return of a negative pulse from winding E3. The winding F3 provides a 5 microsecond ground pulse through rectifier 114 and a positive pulse through rectifier 108b and resistor 102b to set the core connected to U1 and DP1. Transistors RU1 and WU1 therefore conduct in sequence on each read pulse over DP1. Thus as long as the line loop of the calling line is closed, its line circuit 11 is continuously scanned by line finder 1, and a series of negative pulses are provided over the C lead to link 400. Specifically transistor TR9 is pulsed once every 100 microseconds for a 5 microsecond period in synchronism with the read pulse along lead DP1.

It will be noted that, when a pulse was returned from the link to the Units Rewrite Control 195, the transistor WU1 conducted. The winding F3 provides a 5 microsecond pulse of near ground potential over rectifier 114 to lead LU1. This overlaps a similar pulse provided to lead LU1 through rectifier 115 from winding E2 associated with RU1. These pulses are applied to the emitter circuit of each transistor such as TR7 in the line circuits assigned the units digit 1. This prepares these transistors for operation during eight of the ten microseconds of each scanning period, however they remain inoperative at present as no effective pulses are present on the LT1 lead due to the shunt provided at rectifier 113 and the left winding of transformer 175 with the resistor in shunt therewith.

The initial negative step produced on lead PR0 is passed through a differentiating circuit including condenser 409, which passes a negative pulse spike corresponding to the slope of the step. The portion of the impulse giving rise to the negative spike is the vertical step between the "on hook" condition and the "seizure" condition indicated in graph D. The negative spike is passed to the base circuit of transistor TR12. It is arranged as a split load phase inverter, and responds to the negative spike by momentarily causing its emitter circuit to swing negative, while its collector circuit swings positive as indicated in graphs F and F' respectively. When a negative spike is applied to the base circuit of transistor TR12, it tends to drive the transistor towards cut-off thereby driving its emitter circuit negative and its collector circuit positive with respect to the normal condition. The negative pulse at the emitter circuit is blocked by rectifier 412, while the positive pulse at the collector circuit is transmitted through rectifier 413 to the base circuit of transistor TR13. Transistor TR13 becomes conductive, and cuts off transistor TR14, in the well-known manner of an Eccles-Jordan trigger circuit. The collector circuit of TR14 swings towards ground potential to transmit a step voltage through a delay circuit comprising resistors 414, 415 and capacitor 416 for rendering transistor TR15 conductive. The delay circuit has a time constant of approximately .15 second. This period is longer than a dial pulse, which is nominally .062 second, and shorter than the period between each series of pulses resulting from the dial operations. TR15 is arranged as a blocking oscillator and, when its base circuit rises above —24 volts, it conducts. The rise in current flow through the winding 420a causes the upper end of winding 420b to swing sharply positive to transmit a pulse through rectifier 417 to reset TR14 and TR13 to their respective original conditions. Simultaneously the positive pulse is applied over rectifier 419 to the input terminal of Sequence Switch 600. It advances to its first position, wherein Stage 2 comprising transistors 606 and 604 is operated. It then provides —48 volts to the hold lead and removes the —48 volt potential from lead ST1 and applies ground potential thereto in a manner which will be described. When the current ceases to rise in winding 420a, the voltage across winding 420c falls back to its original value so that transistor TR15 is cut off quickly. The current in winding 420a collapses to induce voltages of opposite polarities to the original induced voltages across windings 420b and 420c respectively. The pulse then appearing at winding 420b is blocked by rectifiers 419 and 417. Capacitor 416 is discharged during the pulse by the current flow through winding 420c and the base circuit of TR15.

The —48 volts on the hold lead is applied, as shown in the left hand corner of Fig. 4, through rectifier 426 and resistor 403 to maintain the base circuit of TR9 at a substantially negative potential, when a pulse is applied at PN1 during each scanning period. The allotter is provided with a suitable delay period as mentioned before so that it does not remove the —48 volt potential at rectifier 427 before this time. Its manner of operation will be described shortly. The —48 volts on the hold lead is also applied through resistor 425 to the upper end of rectifier 410. This maintains lead PN at —48 volts during the scanning period, while pulses of a corresponding period are applied at PN2 regardless of TR9 being cut off during the dialling periods when the dial springs are open.

The —48 volts on the hold lead is also applied to the base circuit of transistor TR20 through resistor 413 to prepare the trigger circuit comprising transistors TR19 and TR20 for operation. The absence of —48 volts prior to seizure insures that TR20 is rendered initially conductive. Similarly the Sequence Switch 600 applies —48 volts to the TS lead and the lower end of rectifier 447 to prepare for the transmission of dial pulses.

The ground potential now on the ST1 lead is applied to resistors 431, 432 and 433 respectively. Each resistor has one end tied to a rectifier having a ground pulse applied thereto coincident with the line finder scanning period. Resistors 431 and 432 are clamped to —48 volts between scanning periods at PN3 through rectifiers 434 and 435 respectively. Resistor 433 is clamped to —48 volts between scanning periods at PN4 through rectifier 436. With ST1 at —48 volt potential and a —48 volt potential at PN3 and PN4, leads SPN and PNA and the base circuit of transistor TR16 are effectively at —48 volts. When PN3 and PN4 swing to ground potential during the scanning period, that potential is blocked by the associated respective rectifiers. Leads SPN and PNA and the base circuit of TR16 thus remain at —48 volts. When the ST1 lead is placed at ground potential by Switch 600 and PN3 and PN4, at ground potential during scanning periods, leads SPN and PNA and the base circuit of transistor TR16 are each free to swing toward ground potential during the scanning period.

The ground pulse thus applied over lead SPN is extended to the common selecting circuits and the right winding of transformer 175 shown in Fig. 2a. This gives rise to negative pulse at the upper end of the left winding of the transformer. This pulse effectively blocks rectifier 113 to permit the respective pulses supplied by the sequential conduction of RT1 and WT1 during the scanning period to be applied to LT1 instead of being shunted as before described. A pulse of approximately 8 microseconds and —5 volts over lead LT1 is therefore applied to the base circuits of transistors such as TR7 in all line circuits assigned to one tens digit. This conjunction with the 8 microsecond ground potential applied over LU1 as a result of RU1 and WU1 conducting in sequence, as previously explained, causes only transistor TR7 to conduct during the scanning period. The collector of TR7 then delivers a constant current pulse to junction 4. One path for the current, which path is as yet ineffective, extends over rectifier 62 and the ±L lead and will be described shortly. The other path over which almost the full current passes, extends through rectifier 60 and the right winding of coil 50, the emitter circuit of TR1 and resistor 56 to —24 volts. The path through the emitter circuit of TR1 is by-passed by a condenser 53 which is relatively large. It charges during a number of scanning periods to a substantially constant value to provide a steady potential at the emitter circuit of TR1. For controlling high voltage surges a varistor arrangement 50a is provided in shunt with the right winding of transformer 50. The pulse storage condenser 54, shunting transformer 50 and TR1, is relatively small and therefore passes only the high frequency component of the positive pulse to the base circuit of transistor TR1. Although TR1 is non-conducting at the time the calling line is first scanned, it does conduct as soon as several pulses have been transmitted by TR7 to charge the by-pass capacitor 53. TR2 becomes conductive and its base circuit supplies current to the collector circuit of TR1, when it conducts. Battery is supplied to the base circuit of TR2 through resistor 55 to prevent it from conducting when TR1 is cut off. On the succeeding pulses applied from TR7 through condenser 54 to its base circuit, TR1 is cut off for the duration of the pulse and, in turn, causes TR2 to be cut off. With TR2 cut off, the right side of resistor 6 is free to swing positive so that TR3 is conductive, whenever finder 1 scans line circuit 11. During the 90 microseconds between scanning periods transistor TR1 draws current through the base emitter path of transistor TR2. The collector circuit of TR2 is then held at substantially —48 volts, which is equivalent to the non-calling condition, and transistor TR3 remains cut off even though leads CT1 and CU1 are pulsed to ground by another line finder. Thus any other line finder scanning line 11 during the 90 microsecond period between the scanning periods of finder 1 encounters a non-calling condition at the junction 13, and therefore it advances to scan another line.

If —48 volts were applied continuously to each rectifier such as 427 at every line finder instead of providing an alotter to select line finders, another finder on scanning line circuit 11 after finder 1 and encountering the calling condition would repeat the sequence of events just described. As finder 1 would be the first to provide ground to lead ST1 to enable TR7 to conduct, it would block out the other line finder because of the non-calling condition thereafter provided at junction 13. However this condition is dependent on the time within which the sequence switch is advanced and therefore might result in uneven use of the line finders.

The ground potential applied over resistor 433 from lead ST1 is effective to render transistor TR16 conductive during the scanning periods assigned to line finder 1 as ground potential is applied at that time at PN4. A path is therefore provided for the positive pulse produced on the lead ±L, as a result of transistor TR7 conducting. This path is not immediately effective however due to condenser 451 being at substantially ground potential and holding the lower end of resistor 437 at that potential, thereby blocking rectifier 439 until condenser 451 is charged through rectifier 438 to approximately —24 volts. The path over ±L lead eventually becomes effective and the current which was all applied through rectifier 60 extends through rectifier 439 and the collector circuit of TR16 to battery at the emitter circuit of TR16. Condenser 453 is shunted across the left winding of coil 450 to store energy during a transmission pulse and release it slowly between pulses. Rectifier 491 is biased in the reverse direction at this time by the —24 volt drop across resistor 455, hence it is inactive at present. The described condition at the repeating coils on the lead ±L now represents the calling condition at the calling end of the transmission circuit. When speech currents are applied to the repeating coils they are effective between scanning periods to alter the charges on the storage capacitors 453 and 54. During the scanning period such charge alterations vary the current values through the various branches of the transmission circuit so that an effective reproduction of the applied speech currents are derived at the output. The called end of the transmission circuit is similar except that a transistor such as TR8 at the called line circuit is effective instead of one such as TR7, and the ±N lead is used at the called end of the transmission circuit instead of ±L. The ±N lead is coupled to one winding of transformer 450 by transistor TR23 in the same manner as the other winding is coupled to lead ±L by transistor TR16.

Capacitor 410 and resistor 411 in Fig. 4, acting in a manner similar to capacitor 409 and associated resistors, cause a negative spike, such as shown in graph G to be applied to rectifier 441, when lead PR0 swings negative in response to the step voltage occurring upon seizure. Rectifier 441 blocks the spike. A negative potential is also applied to rectifier 442 from the PR0 lead and to the base circuit of transistor TR17. TR17 conducts, causing the base circuit of transistor TR18 to swing negative, and TR18 is cut off. TR18 is connected as a free running blocking oscillator. It normally produces a chain of positive pulses at the upper end of winding 440b which are applied to reset the Sequence Switch 600 to its initial condition and a chain of negative pulses at the lower end of winding 440a, which are applied to flip-flops FF1 and FF2 to ensure that they are in a non-operated condition. During pulse periods the current through winding 440a rises linearly, inducing a constant voltage in winding 440c such as to maintain TR18 conducting, however condenser 428 is charged in a negative direction by the current flow in 440c and steadily diminishes the current flow until it is no longer sufficient to maintain conduction in TR18. It then cuts off and remains so while capacitor 428 slowly discharges through resistor 429. Eventually capacitor 428 discharges sufficiently to again bias transistor TR18 conductive to initiate another pulse. Thus a continual series of reset pulses are generated until TR17 conducts. If the negative potential is removed from lead PR0, due to opening of the line loop, transistor TR17 is cut off. TR18 then conducts if lead PR0 remains positive for a period determined by the time constant of condenser 428 and resistor 429. The opening of the line loop due to dialling is of insufficient duration to allow condenser 428 to discharge sufficiently for TR18 to fire before TR17 again conducts on the closing of the line loop. The link is now prepared to receive dial pulses.

*Connector selecting circuit preparation*

The first ground pulse applied over lead PNA as a result of a pulse at PN3 and the ground potential on ST1 is applied across transformer 399 to derive a positive potential. This positive potential is applied over resistor 321 to the collector circuit of INH5 (Fig. 3) in multiple with rectifier 393 and the primary winding of transformer 320. A positive pulse at RM3 provided simultaneously with the pulses at RM1 and RM2 and of the same duration prevents the pulse from transformer 399 from being shunted by rectifier 393 during its duration. A negative pulse is therefore developed on the WS' lead which effectively blocks rectifiers 307 and 307a, etc., to negative potentials at their respective other terminals in the same manner as described for rectifiers 107 and 107a. Similarly the pulse from transformer 399 is simultaneously applied over resistor 396 to the collector circuit of INH6 in multiple with rectifier 394 and the primary winding of transformer 340. That pulse is prevented from being shunted over rectifier 394 by a positive pulse applied at RM4 simultaneously with RM3 and of the same type. A negative pulse is therefore derived on lead WD' as a result of the induced voltage across the secondary of transformer 340.

On release of the previous connection the pulses over PNA were terminated thereby preventing any of the leads WS', WS1', WD' or WD1' from being pulsed. Blocking oscillators WT0'–WT9' and WU0'–WU9' therefore remain non-conductive regardless of the initial conduction by one in each set of blocking oscillators RT0'–RT9' and RU0'–RU9' respectively. This is because the respective pulses returned therefrom are shunted to ground over the respective WS', WS1', WD' and WD1' leads. RT0'–RT9' and RU0'RU9' remain non-conductive, after the first read pulse on DP1' following release of the previous connection as WT0'–WT9' and WU0'–WU9' failed to conduct and therefore no cores were set.

When a pulse again arrives over the PNA lead as a result of the seizure of the particular link only the blocking oscillators WT0' and WU0' can conduct. That is because only rectifiers 307 and 307b now have both a blocking potential applied thereto over leads WS' and WD' respectively and battery connected at the respective other terminals thereof. The battery is permanently connected through resistors 304 and 304b to both the WT0' and WT1' and the WU0' and WU1' oscillators respectively, but is shunted from WT1' and WU1' through rectifiers 306a, and the corresponding rectifier connected to WU1' (not shown). The isolating resistor 319 and the corresponding isolating resistor connected to WU1 prevent this shunt from being effective as far as WT0' and WU0' are concerned. Therefore when negative potentials are produced on WS' and WD' as a result of the pulses over PNA, oscillators WT0' and WU0' conduct so that the respective cores connected between T0' and U0' and the DP1' lead are set during each half write pulse and are read out by each read pulse to render RT0' and RU0' respectively conductive. RT0' and RU0' do not render either WT0' or WT1' or WU0' or WU1' conductive as no effective connection is provided therefor. WT0' and WU0' conduct anyway in each scanning period as explained above. The connector selecting circuits are now prepared to receive dial pulses.

*Allotter operation*

The negative potential provided over lead A' when transistor TR9 became conductive blocks rectifier 511 so that the —48 volt potential on lead B' is passed through resistor 510 and rectifiers 501 and 502. The potential passed through rectifier 501 is applied to the reset terminal of flip-flop FF3. Specifically it is applied to the base circuit of transistor 503 which is arranged together with transistor 504 as a flip-flop. Flip-flop FF3 individually corresponds to link 400 and that link is selected by the allotter in a manner to be described when flip-flop FF3 is in the state shown. Transistor 503 now conducts to cut off transistor 504. The collector circuit of 503 swings from substantially —48 volts to a more positive value or substantially ground potential. Capacitor 505 in conjunction with resistor 506 acts to delay the application of the positive swing to lead B' and rectifier 427. The time constant of this circuit is long enough to permit the Sequence Switch 600 to operate before lead B' swings positive. This ensures that the —48 volts is provided at gate AND–1 until the hold lead is prepared by the sequence switch.

The pulse passed through rectifier 502 is applied to the "In" terminal of flip-flop FF4. Rectifier 502 is connected in a manner similar to rectifier 507 and the pulse is applied to the base circuit of a transistor such as 504. As the link corresponding to flip-flop FF4 has not been selected by the allotter, the transistor corresponding to 504 is non-conductive, while the transistor corresponding to 503 is conductive. The states of the transistors of flip-flop FF4 are reversed by the pulse applied through rectifier 502. After a period of time determined by the time constant of condenser 512 and resistor 513, lead B'' swings to —48 volts. If the link associated with flip-flop FF4 is busy, the transistor corresponding to TR9 in that link is conductive. When lead B'' is at —48 volts rectifier 508 passes a negative potential to the base circuit of a transistor such as 503 to return flip-flop FF4 to its initial state. A simultaneous potential is applied to rectifier 509 to test the next flip-flop in the same manner. If the link associated with FF4 is idle, FF4 remains in the condition shown for FF3 as the rectifier connected to lead A'' remains unblocked. The collector circuit of the transistor corresponding to 503 applies —48 volts at the out terminal to lead B'' corresponding to lead B' and prepares its associated link for use. An isolating resistor such as 510 prevents the —48 volt potential from being shunted over a lead such as A' to ground connected to the emitter circuit of the transistor corresponding to TR9. In this manner the allotter tests each link and selects one for use in extending a connection.

*Sequence switch operation*

The sequence switch 600 comprises a series of flip-flop circuits each of which is arranged to be rendered conductive in a manner similar to that described for the sequence switch in the aforementioned Faulkner application.

Specifically the pulse applied through rectifier 419 is applied to the emitter circuits of transistors 601, 603, etc. of Stage 1, Stage 2, etc., respectively. Only the transistors 601 and 602 of Stage 1 are initially conductive. The positive pulse applied to the emitter circuit of transistor 601 renders both transistors of Stage 1 non-conductive, while the positive swing in the collector circuit of 601 is passed through condenser 605 to render transistor 604 conductive. Transistor 606 also conducts due to the regenerative action therebetween. Desired voltages are derived at the collector circuit of each transistor of the stages. Thus at terminal "1P" of Stage 2 a positive voltage is derived when 606 is conducting and negative when not, while the terminal "1N" a negative voltage is derived when 604 is conducting and positive when not. A similar condition is provided at each other stage in the sequence switch. Thus when Stage 3 (not shown) is conducting, a positive voltage is derived at terminal "2P" and a negative voltage at terminal "2N." Stage 3 (not shown) but identical to Stage 2 is rendered conductive as a result of a pulse through rectifier 419, after the first digit is dialled. After the second digit, Stage 4 (not shown) and the same as the others is rendered conductive in the manner described to enable a busy test to be performed. Lastly, a Stage 5 (not shown) and the same as the others is rendered conductive.

Thus at terminal "1N" of Stage 2 −48 volts is provided to lead TS and also through rectifier 610 to the hold lead. At terminal "1P" ground potential is provided through rectifier 611 to lead ST1. When Stage 3 is effective instead of Stage 2 lead US has −48 volts applied thereto from terminal "2N" corresponding to "1N." Terminal "2P" corresponding to "1P" supplies ground to lead ST1. Likewise in Stages 4 and 5, terminals "3P and 4P" and "3N and 4N" respectively correspond to "1P" and "1N" respectively. When their respective stages are operated they supply corresponding potentials to leads BT and the hold lead to leads ST1 and ST2 respectively.

When the call is terminated a chain of reset pulses are applied over the reset lead and through condenser 612 to reverse the state of any conductive stage. This causes the next stage to become conductive in a manner explained. When the last stage is rendered non-conductive it returns a positive pulse through a condenser such as 605 to the base circuit of 601. It is therefore rendered conductive as is 602. They thereafter remain conductive as the pulses applied over condenser 612 are not applied thereto.

*Dial pulse transmission*

The subscriber on operating his dial opens and closes the line loop a number of times corresponding to the dialled digit. Assuming the calling subscriber is calling the subscriber at the station connected to line circuit 21, he will dial the digits 21 in sequence. The right end of resistor 6, which is at −48 volts for 90 microseconds out of each scanning cycle, due to the conduction of TR1 and TR2, is free to swing positive for the remaining 10 microseconds or during the scanning period of the seized link. It falls back to −48 volts whenever the line loop is opened during a scanning period. It should be kept in mind that the line circuit is being scanned once every 100 microseconds, whereas during dialling, each dial spring opening is approximately 62,000 microseconds long and the closed period therebetween is approximately 38,000 microseconds long. Therefore approximately 620 scanning periods are provided on each dial opening and about 380 on each dial spring closing. The line loop being opened a number of times corresponding to the digit dialled causes transistors TR3 and TR4 to assume their original condition a number of times corresponding to the dialled digit. TR9 consequently is cut off during each opening of the dial. Its emitter circuit swings positive and a steady ground potential is passed by the demodulating circuit to the base of TR10. It appears at the base circuit of TR10 with a framing pulse superimposed thereon as shown at C′ in graph C. As the ground potential without the framing pulse is below the "Off" trigger level of TR10—TR11, the trigger circuit is reset to its initial state. The collector circuit of TR11 swings in a positive direction driving the PR0 lead towards ground potential as shown at D′ of graph D. The positive swing is then differentiated by condenser 409 and its associated resistors to produce a positive spike as represented at E′ of graph E. This spike is applied to TR12, and its collector circuit produces a negative spike in response thereto, while its emitter circuit produces positive spike, as shown at F1 and F2 respectively.

Neither spike has effect at this time. When the dial springs reclose to terminate an impulse, spikes of opposite polarity such as on seizure are produced. The positive spike then at the collector of TR12 is passed by rectifier 413 and reverses the state of the flip flop circuit comprising TR13 and TR14, which applies a step voltage to the input of the delay circuit connected to the base circuit of TR15. If the digit being dialled is other than "1," a second impulse will start about 40 milliseconds after the first. The resulting positive spike at the emitter of TR12 is passed by rectifier 412 to return the flip flop TR13 and TR14 to its normal state, which removes the step voltage from the input to the delay circuit. The charge built up on capacitor 416 in the interim is now rapidly removed over a low resistance path through rectifier 421 and resistor 414. The charging and discharging of capacitor 416 is repeated as long as further impulses are received in a continuous train. After the last impulse has been received the flip flop is in the reversed state and the step voltage is applied to the delay circuit. In about 150 milliseconds TR15 conducts to generate a pulse in winding 420b to advance the Sequence Switch 600 and to reset the flip flop through rectifier 417.

Each positive pulse applied to PR0 is also differentiated by condenser 410 and resistor 411 to provide a positive spike, which is passed through rectifier 421 to render TR19 conductive and to cut off TR20, as its emitter circuit swings positive and its base circuit swings negative. The collector circuit of TR19 swings negative, and a negative step voltage is passed through a delay circuit including condenser 445 and resistor 446 to block rectifier 444 to a negative potential at its other terminal. When the line loop is reclosed at the end of each dial pulse TR10 is rendered conductive in synchronism with a framing pulse in the manner explained on seizure and a negative potential is reapplied to lead PR0 resulting in a negative spike at TR12 and rectifier 441 respectively. Rectifier 441 blocks the negative potential on lead PR0 from transistor TR19. The negative potential on lead PR0 is applied to block rectifier 442 to negative potential on its other side. Therefore the first negative pulse at PN5, which is coincident with the first scanning period following the framing pulse which aids in rendering TR10 conductive on each reclosing of the dial springs, is passed from PN5 to the base circuit of emitter follower TR21. Condenser 445 is completely charged, before the dial springs close, so a negative blocking voltage is applied to rectifier 444 at the same time that the negative blocking voltage from lead PR0 is applied to rectifier 442. This prevents pulse mutilation. The −48 volt potential applied by the Sequence Switch 600 over the TS lead to the lower end of rectifier 447 and the negative potential now applied over the delay circuit to rectifier 444 prevents the base circuit from being shunted, while isolating resistor 452 prevents the base circuit from being shunted by ground on lead US at the lower terminal of rectifier 448. Transistor TR21 therefore conducts on each closing of the dial springs, and its emitter circuit passes a negative pulse over lead TS1 to the connector common selecting circuits. A small positive swing occurs at the right of resistor 448 in the collector circuit of TR21, and is passed through rectifier 449 to the base circuit of TR20 to render TR20 conductive and cut off TR19 before a second negative pulse is applied at PN5. Condenser 445 discharges, before the next pulse appears at PN5, so that gate And-2 is closed before a second pulse appears at PN5. The collector circuit of TR19 returning to ground potential opens rectifier 444 to shunt any other pulses at PN5 from affecting TR21. TR19 and TR20 are now set for the next dial pulse. The aforedescribed operation takes place on each opening and closing of the dial springs to pass pulses corresponding to the tens digit of the called line over lead TS1.

The negative spike at the base circuit of TR12 resulting from each closure of the dial springs, as they are operated, conditions TR12, TR13 and TR14 as on seizure. Because of the delay circuit including condenser 416 connected to the base of TR15 through winding 420c, nothing occurs at TR15 until the dial operation is completed as the time constant of resistor 414 and 415 in series with 416 is more than .15 of a second. TR14 and TR13 are of course reset on each opening of the dial springs as explained.

Each opening of the dial springs of course cuts off TR17, and each closing restores the negative potential to the base of TR17 to render it conductive. Its being cut off on each opening of the dial is immaterial, as TR18 is held below cut off during the short dial openings by the charge on condenser 428. The period during which TR17 is cut off as a result of the PR0 lead swinging to positive or ground potential is less than the time constant provided by condenser 428 and resistor 429 as previously explained.

At the end of the first digit dialled the PR0 lead swings negative and this results in rendering TR15 conductive, after a delay, as explained on seizure. The Sequence Switch 600 is advanced to its second position, where the —48 volts is removed from the TS lead and placed on the US lead to block rectifier 448. The hold lead is retained at —48 volts and lead ST1 is retained at ground potential. On the second series of dial pulses, corresponding to the second digit of the called line, transistors TR19 and TR20 are conditioned as on the first series of dial pulses. Transistor TR22 is now rendered conductive, once for each dial closing in the same manner as TR21. TR21 does not become conductive as it is now shunted by rectifier 447 to ground on the TS lead, while isolating resistor 451a prevents TR22 from being shunted over rectifier 447. TR22 passes pulses corresponding to the units digit of the called line over lead US1. TR20 and TR19 are reset after each pulse by the positive swing produced at resistor 448 as already explained.

The first negative pulse on lead TS1 produced by operation of the dial arrives simultaneously with a pulse over lead PNA. The pulse over lead PNA is applied to transformer 399 and the positive potential derived therefrom is applied to the collector circuit of transistor INH5. The pulse over TS1 is first transformed into a positive pulse, by transformer 360. It is applied to the base circuit of transistor INH5 and through resistor 331 to rectifier 391 in multiple with the primary of transformer 330. A positive pulse is subsequently applied at RM3, blocking rectifier 391, and causing the current flowing through resistor 331 to flow through the primary of transformer 330 to induce a voltage across the secondary, giving rise to a negative pulse on lead WS1' to block rectifiers 306 and 306a etc. Transistor INH5 conducts in synchronism with the positive pulse over lead PNA and the negative pulse on lead TS1 and therefore is conductive for substantially ten microseconds. It shunts the positive pulse derived from transformer 399 from the winding of transformer 320, despite the blocking potential supplied at RM3, to prevent a pulse on WS'. As a result of the negative pulse over WS1' now blocking rectifier 306a, while rectifier 307 remains unblocked, transistor WT1' is rendered conductive as battery is supplied thereto through resistor 319 in a manner similar to that explained for WT0'. This results in setting the connector core connected between T1' and DP1' corresponding to link 400 on the occurrence of a half write pulse on lead DP1' in a manner explained for setting other cores. RT1' conducts on the next read pulse along lead DP1'. It will be remembered that many scanning periods occur between successive dial pulses. As lead PNA is pulsed periodically for the duration of the call, negative pulses are supplied periodically to lead WS' to permit the return of a negative pulse to WT1' for rendering it conductive to reset the corresponding core after each read pulse until the next impulse, if any is received. The battery supplied through resistors 304 and 319 is ineffective at either WT0' and WT1' when RT1' is conductive as substantially ground potential is supplied through rectifier 386 to rectifiers 387 and 388 to the lower end of resistors 304 and 319. The succeeding dial pulse gives rise to a negative pulse on lead TS1, and lead WS1' therefore swings negative as just explained. RT1' now returning a pulse renders WT2' conductive in a manner already explained, and it sets the core connected between T2' (not shown) and DP1' on occurrence of a half write pulse. A connection from RT2' through a rectifier such as 386 to rectifiers 387 and 388 prevents the battery applied to 304 and 319 from having any effect when RT2' is conductive. A similar connection provided at other RT' oscillators serves the same purpose. Thus successive RT' and WT' connector blocking oscillators are rendered conductive for every pulse received over lead TS1. When pulses are no longer received over lead TS1, transistor INH5 remains inactive to allow the pulses over PNA to be repeated as negative pulses on lead WS'. This maintains the core corresponding to the dialled tens digit set on occurrence each half write pulse on lead DP1'. Therefore the corresponding RT' read oscillator conducts on each read pulse thereafter arriving on the DP1' lead. As the called line's tens digit is 2 in this example oscillators RT2' and WT2' are rendered conductive on each read pulse along lead DP1' after the tens digit is dialled.

The second dialled digit gives rise to a series of negative pulses on the US1 lead in a manner explained for lead TS1 and they are transformed into positive pulses by transformer 370. These pulses represent the units digit of the called line. Each pulse on lead US1 causes transistor INH6 to conduct in the same manner as INH5 to shunt the current pulse flowing through resistor 396, as a result of the pulse on the PNA lead. This prevents the WD' lead from being pulsed, while the transformed pulses from lead US1 in conjunction with the positive pulse at RM4 cause a voltage to be induced across the secondary winding of transformer 350. Negative pulses are therefor applied to the WD1' lead as explained for WS'. The units write blocking oscillator such as WU1', corresponding to the dialled digit is thus rendered conductive, and is maintained thereafter conductive in a manner explained to set a corresponding units core on lead DP1' associated with link 400. Each pulse along lead PNA occurring after the pulses on the US1 lead terminate, cause lead WD' to be pulsed continuously, all as explained for the WS' lead and therefore the same units core is continuously set to provide a pulse for its corresponding read oscillator such as RU1' on each read pulse along lead DP1'. A rectifier such as 386a corresponding to rectifier 386 is connected to rectifier 387a and a similar rectifier at WU1'. The arrangement is provided for the same reason as rectifiers 386, 387, etc., namely to render the battery connected to resistor 304b, etc. ineffective when the memory is advanced.

As the called line is assigned the digits 21, read blocking oscillators RT2' and RU1' (not shown) and the corresponding associated write oscillators WT2' and WU1' (not shown) respectively are rendered conductive as a result of each read pulse along lead DP1' after the dial operation terminates in a manner already explained. Lead NT2 and lead NU1 therefore swing to —5 volts and ground, respectively, for the 5 microseconds out of every scanning cycle that RT2' and RU1' respectively are conductive and the following 3 microseconds that WT2' and WU1' respectively are conductive alone. However NT2 is effectively shunted by a rectifier such as 313 and the secondary of transformer 375. Ground potential is applied to rectifiers corresponding to 35 and 36 respectively at the called line circuit when leads CT2' and CU1' swing from —48 volts as already explained for leads CT1 and CU1.

Busy test

At the end of the second series of dial impulses lead PR0 is restored to the condition corresponding to the seizure condition shown on graph D. Transistors TR12, TR13, TR14 and TR15 respond as previously described and after the described delay TR15 is rendered conductive to advance the Sequence Switch 600. The switch is advanced to its fourth stage to remove the —48 volt potential from lead US and apply —48 volts over lead BT and the connected differentiating circuit including capacitor 471 and resistor 472 to the rectifier 473 and from there to the "on" terminal of flip flop FF2 to switch it on. It is applied to the base circuit of transistor TR24 to render it conductive and cut off TR25. FF2 now provides a positive step voltage to resistor 484 from the collector circuit of TR24. The —48 volts on lead BT is also fed through isolating resistor 474 to the junction of rectifiers 475, 476 and 477. The synchronized negative pulse appearing at PN6 during each scanning period prevents this step voltage from being shunted at rectifier 476 during that period. The positive step voltage from FF2 is applied to rectifiers 481 and 484a through a delay circuit comprising condenser 483 and resistor 484. The delay circuit enables the busy test to be conducted before the Ringing Control Amplifier 495 is rendered effective.

If the called line is busy a negative pulse appears on the CN lead during each scanning period. This is because ground is applied respectively from the leads CT2' and CU1' to rectifiers such as 35 and 36 at the called line, while the —40 volt potential supplied to a resistor such as 7 with the called line loop closed gives rise to a condition on the CN lead of the called line similar to that explained for the C lead of the calling line. Transistors such as TR5 and TR6 connected to the CN lead are arranged in a manner similar to transistors TR3 and TR4 connected to the C lead and function in a similar manner to thereby reverse their condition during the scanning period from the state shown. A negative pulse therefore appears on lead CN during the scanning period and blocks rectifier 475. In conjunction with the synchronized negative pulse at PN6 blocking rectifier 476, the —48 volts applied through resistor 474 is transmitted through rectifier 477 to the "on" terminal of flip flop FF1 to switch it on. Namely it is applied to the base circuit of transistor TR26 which conducts to cut off TR27. FF1 then provides a negative step voltage from the collector circuit of TR27 over resistor 462 to rectifiers 463 and 491. As the upper terminal of rectifier 463 is at —48 volts applied from lead ST2, the step is blocked thereat and instead passes through rectifier 491. The current through rectifier 491 is varied in accordance with the busy tone transmitted over condenser 461 and is applied to the transmission circuit of the calling line where it varies the current therein accordingly so that the calling party hears the busy tone and releases the connection. The output of FF1 is also fed to the "off" terminal of flip flop FF2. Namely it is fed through a differentiating network comprising condenser 464 and resistor 465 and from there through rectifier 466 to the base circuit of TR25 to render TR25 conductive and render TR24 non-conductive. This terminates the operation of FF2. This is done before the step FF2 produced at resistor 484 is passed through the delay circuit to the Ringing Control Amplifier 495.

Ringing

In the event that the called line is idle no pulses appear on the CN lead when the called line is scanned. FF1 therefore remains unoperated. The delay circuit connected to the output of FF2 transmits the positive step therefrom when rectifier 481 is blocked by the synchronized positive pulse at PN7. The resulting positive pulse is passed through rectifier 419' to advance the Sequence Swith 600. The switch advances to change the ST2 lead from —48 volts to ground potential in a manner explained. The positive pulse derived from the delay circuit is also fed through rectifier 484a to the Ringing Control Amplifier 495 so that a ringing control pulse train is provided over lead RC in any well-known manner.

Applying the ground potential from ST2 through resistors 456 and 466a respectively enables ground pulses to be applied over lead SPNA and to the base circuit of transistor TR23 respectively during the scanning periods by the blocking of rectifiers 457 and 458 to that potential at PN8 and PN9 respectively. Simultaneously busy tone is prevented from appearing on the transmission circuit, when flip flop FF1 is subsequently operated, by ground potential applied through resistor 467 to rectifier 463 to shunt the output of FF1. Pulses over SPNA are effectively transmitted when the synchronized pulses are applied at PN8. Transistor TR23 is rendered conductive during the scanning periods to enable the called end of the transmission circuit to carry speech and audio-frequency currents as explained for its corresponding transistor TR16 at the calling end of the transmission circuit. The pulses on SPNA are transmitted to the transformer 375 in Fig. 3a, which corresponds to transformer 175 already discussed and effectively provides the same condition for preventing the NT2 lead from being shunted in a manner similar to that explained for lead CT10. An 8 microsecond pulse of approximately —5 volts is therefore applied over lead NT2 whenever RT2' and WT2' corresponding to the tens digit of the called line are conductive. A corresponding pulse of approximately ground potential is simultaneously applied over lead NU2 in a manner similar to that explained for lead LU1.

These pulses are applied during the scanning periods to a transistor such as TR8 in the called line circuit 21. Specifically the —5 volt potential on lead NT2 is applied to the transistor base circuit and the ground potential is applied to the emitter circuit thereof. The operation of the called end of the transmission circuit including a transistor such as TR8 is the same as that explained for the calling end. Namely the transistor corresponding to TR8 at the called line conducts simultaneously with TR23 and also simultaneously with TR16 and TR7 which are also conductive during the same scanning period. The low frequency components of the pulse train are transmitted through the winding of a repeating coil such as 50 at the called line circuit and the high frequency components are transmitted through a condenser such as 54 at the called line circuit. Transistors such at TR1 and TR2 at the called line circuit. Transistors such as TR1 and TR2 at the called line are controlled in a manner similar to that explained for those transistors. Thus during substantially 90 microseconds of the scanning cycle they are conductive to provide a —48 volt potential at a junction such as 13 during the same period as transistors TR1 and TR2. This prevents another line finder from being halted at this line when the called party answers. During the 10 microseconds scanning period now individual to the calling line and called line these transistors are cut off to enable the connection to be maintained and supervised. At PN9 8 microsecond clock pulses synchronized with the scanning periods are supplied to the called end of the transmission circuit for the same purpose as those supplied at PN4, however they too are only effective to enable the called end of the transmission circuit to pass audio-frequency currents when the —48 volts is removed from lead ST2 and replaced with the ground potential.

The current pulsations supplied to lead RC during the scanning periods, when rectifiers such as 35 and 36 are biased by ground potential on the CT2' and CU1' leads respectively are passed through a transformer such as 40 at the called line only. At all other line circuits the current pulsations on lead RC are shunted through rectifiers such as 35 and 36. An isolating resistor such as 39 prevents the shunt at the other lines from being effective at the called line circuit while rectifier 37 blocks it from a junction such as 77. The current passing through the primary of a transformer such as 40 at the called line causes the starter anode of a gas tube such as 42 connected to the secondary thereat to swing positive so that conduction initially takes place between the starter anode and cathode of the tube. Ringing current which is applied to the anode thereof has +60 volts superimposed thereon during one half of each ringing cycle and +160 volts superimposed thereon during the other half of each cycle. The tube breaks down and conducts when the +160 volts is applied thereto in conjunction with the positive swing applied from transformer 40, over a path including resistor 9, hookswitch springs 2 and the called party's ringer to ground. The ringer then operates to signal the called party. Capacitor 8 acts to feed a portion of the ringing current around rectifier 45 and over the now open effective called and calling ends of the transmission circuit to provide a ring back tone signal to the calling party.

Answer

The called party on answering completes the calling end of the line loop and disconnects his ringer. A junction such as 77 at the called line assumes the same condition as explained for the calling line. Whenever the called line is now scanned by the connector common selecting circuits a positive swing is passed through a rectifier such as 38 to reverse the states of transistors such as TR5 and TR6 to place negative pulses on the CN lead. A busy condition is thus provided at the called line. The negative pulses on CN are effective to operate flip flop FF1, which provides an output such as previously described when the called line is busy. The output turns off flip flop FF2 as already described to prevent the further operation of Ringing Control Amplifier 495. The busy tone remains ineffective as rectifier 463 shunts the output from the transmission circuit, while resistor 462 prevents the output of FF1 from being shunted from FF2. As pulses are no longer applied across the called line's transformer such as 40 the tube 42 will remain extinguished after its anode has swung to 60 volts during one half of the ringing current cycle.

The speech transmission circuit extends from the calling end of the line loop including the +L lead, rectifier 45, upper left winding of coil 50, condenser 51, lower left winding of coil 50, the −L lead and the station circuit (not shown); the right winding of coil 50 and condenser 53, rectifiers 60, 62, the ±L lead, rectifiers 439, 438 and the left winding of coil 450 with condenser 451, the right winding of coil 450 and condenser 459, rectifiers 454, 499, the ±N lead, and rectifiers such as 64 and 65, a coil and condenser such as 50 and 53 respectively and the called end of the line loop such as described for the calling station. The current in both the calling and called ends of the transmission circuit is divided into several branches as has been explained for the calling side of the transmission circuit. As the current at either end is varied by speech signals which are transmitted from either end over the repeating coils such as 50 the current in each branch is varied accordingly. As speech currents normally range from 200 to 3000 cycles per second and the lines are being scanned once every 100 microseconds, the speech currents are sampled once in every one ten-thousandth of a second to provide an accurate reproduction of the speech currents. Multiplex arrangements for sampling speech current to transmit a reproduction thereof are well-known. The specific arrangement shown herein is disclosed and explained in greater detail in my aforementioned prior application.

Release

If the calling party received busy tone or the call was not answered he replaces his handset. The upper terminals of rectifiers 25 and 26 and also 35 and 36 swing back to −48 volts regardless of any scanning and transistors TR3 and TR4 return to normal. TR9 is therefore cut off continuously and the base of TR10 returns to a level below the off condition. TR11 conducts and returns the PR0 lead to ground and a positive spike is applied to TR12. The positive spike on its emitter circuit resets TR14 and TR13. Transistor TR17 is biased to the off condition by the ground potential on the PR0 lead and TR18 conducts after a period determined by the delay circuit to provide a pulse from winding 440b through rectifier 419' to the reset terminal of the Sequence Switch 600 to set it back to its original condition in a manner explained. A series of such pulses are provided in the event the Sequence Switch must be advanced through several stages before transistors 601 and 602 are rendered conductive. Ground is then returned to the hold lead and to lead BT. Leads ST1 and ST2 are returned to −48 volts. A negative pulse provided at the lower end of winding 440a is simultaneously sent through rectifiers 481a and 482 respectively to the base circuits of TR27 and TR25 respectively of FF1 and FF2 respectively and one or both depending on the state of the call are returned to normal. The positive pulse applied through rectifier 441 from the PR0 lead renders TR19 conductive and TR20 is extinguished but they are reset to the condition shown when ground is applied to the hold lead upon resetting of the Sequence Switch 600 to normal. The connector memory is also set to the position previously explained as pulses are no longer provided over lead PNA. The line finder resumes scanning in the manner explained from its last position due to the absence of pulses on lead PN. Likewise the transmission circuit is returned to normal by the removal of ground at ST1 and ST2 and the advancement of the line finder scanning. The procedure on a completed call is much the same except that release by the called party merely returns his line to the non-answered condition. Since FF2 remains in the Off condition re-ringing is prevented. Release by the calling party restores the circuits as described above.

Appended hereto are a series of claims which are believed to define the scope of the invention.

What is claimed is:

1. In a communication system wherein a number of lines are provided from which calls may be initiated for completion to respective called lines, a plurality of links connected in common to all of said lines and arranged to be scanned sequentially, means commonly associated with all of said links and all of said lines conditioned whenever a link is scanned for testing a line, said means effective if a call is initiated at one line for conditioning a scanned link over said common connection simultaneously with the testing of said one line to render said scanned link effective for extending a call to a called line.

2. In a system such as claimed in claim 1, a memory for each link set in accordance with the directory number assigned a line, said common means arranged to test the line corresponding to the memory setting of the link being scanned and conditioned in the event a tested line is idle for changing the setting of the memory in accordance with the directory number of another line.

3. In a system such as claimed in claim 2, an arrangement effective whenever a link is conditioned over said common connection on initiation of a call for controlling said common means to set the memory of said link in accordance with the directory number of the tested calling line.

4. A system such as claimed in claim 1, in which said common means includes a number of transistor oscillators, each of which corresponds to a different digit.

5. In a system such as claimed in claim 1, pulse responsive means at each link effective on the transmission of dial pulses over said common connection from a calling line only if said dial pulses are transmitted from the simultaneously tested line, another means commonly associated with all said links for testing a line whenever a link is scanned, said last means rendered effective by said pulse responsive means on the transmission of dial pulses corresponding to the directory number assigned a called line for testing said called line simultaneously with said tested call line.

6. In a system such as claimed in claim 5, a memory for each link, said other common means arranged to set each memory in accordance with the directory number corresponding to the dial pulses transmitted from a calling line to render the corresponding link pulse responsive means effective whereby the called line assigned the directory number corresponding to the transmitted dial pulses is tested whenever said line initiating a call is tested.

7. In a system such as claimed in claim 5, a testing arrangement effective when a called line is tested by said other common means for transmitting an indication of the condition of said called line to said calling line.

8. In a system such as claimed in claim 5, a signal at each line, an arrangement in each link for controlling the signal at a called station to signal a party thereat in the event said called line is idle.

9. In a system such as claimed in claim 5, a speech transmission path, an arrangement in each link for controlling said speech transmission path in a time period individual to each link to enable conversation between a calling and called line on answer by said called line.

10. A system such as claimed in claim 5 including another common connection between all of said links and all of said lines, means effective when a called line is tested for signalling only said called line over said other common connection.

11. In a system such as claimed in claim 5, a speech transmission path connected in common to all lines and all links, and means controlled by both said first and said other common means whenever a calling line and called line are simultaneously tested for transmitting signals over said transmission path only between said calling and called lines.

12. A telephone system comprising a number of calling lines, a plurality of links with a common connection thereto, a plurality of called lines, and means controlled over said common connection on initiation of each call from any of said lines for controlling said links in a periodic sequence over the common connection for completing respective simultaneous calls from said calling lines to said called lines.

13. A system such as claimed in claim 12, in which said means comprises a scanning arrangement conditioned to scan one line and one link at a time, and means conditioned when a scanned line initiates a call for thereafter causing said arrangement to scan said line and one link periodically during the duration of said call.

14. A system such as claimed in claim 12, in which said means comprises a memory individual to each link, and a last means common to each memory and arranged to be controlled in a period individually corresponding to each link in accordance with the setting of its associated memory for scanning a line corresponding to the memory setting of each link in the period individual to the associated link.

15. A system such as claimed in claim 14, in which said last means comprises an oscillator for each digit assigned said lines, each oscillator rendered effective to apply a scanning pulse to a line assigned its corresponding digit whenever a memory setting corresponds thereto during the period individually corresponding to the link associated with said memory.

16. A telephone system including means for supplying electrical pulses to a plurality of links in a time period individually corresponding to each of said links, comprising a plurality of lines, means common to said links and lines for testing a line in the time period individual to each link in response to the supply of one of said pulses, means in each link arranged to cause the last means to test the same line in response to another electrical pulse in each time period individual thereto if the first test indicates a line initiating a call, means in each link effective only during the time period individual to each link to receive dial pulses corresponding to a called line, means common to all of said links and lines and set by said dial pulse receiving means during the time period it is effective for enabling a connection to be completed to a called line assigned a number corresponding to said dial pulses.

17. A communication system having a number of lines, a number of links with a common connection to said lines, a memory for each link, selecting circuits common to the link memories, each memory rendered effective in sequence for controlling said selecting circuits to test the line corresponding to the setting of each effective memory, and means effective if a line initiates a call and is tested for seizing over said common connection the link whose memory controlled said selecting circuits.

18. A system such as claimed in claim 17, in which said selecting circuits are arranged in a matrix to permit each memory to control certain ones thereof individually corresponding to a memory setting.

19. A communication system having a plurality of links which are scanned sequentially, a plurality of lines, means for scanning said lines in response to the scanning of said links, a common connection extending between said links and said lines, and means rendered effective over said common connection in response to the scanning of a calling line for controlling only a simultaneously scanned link to extend a connection from said calling line to a called line.

20. In a system such as claimed in claim 19, means in each link responsive to dial pulses transmitted over said common connection when its associated link is scanned to repeat said dial pulses, and means associated with all of said links and all of said lines controlled by said repeated dial pulses to condition a called line whenever the link at which said dial pulses are repeated is scanned.

21. For use in a communication system having a number of lines, a plurality of links connected in common to said lines, means for conditioning said links sequentially to scan any of said lines, means controlled over said common connection in response to the conditioning of a link and the initiation of a call from one of said lines to cause said link to scan only said one line when said link is thereafter conditioned.

22. A communication arrangement comprising a number of lines, a plurality of links having several common connections to said lines, an arrangement whereby each link is cyclically scanned in a time period individual thereto, means common to all of said links and effective during each period for simultaneously scanning a line, said means effective on initiation of a call from one of said lines when said line is scanned for conditioning a simultaneously scanned link over one of said common connections, said link conditioned for controlling said means to scan the same line during a number of its succeeding scanning periods, pulse responsive means in said link effective to repeat dial pulses transmitted over said one connection during certain of said succeeding scanning periods, means commonly associated with all of said links thereafter responsive to said repeated dial pulses whenever said link is scanned for scanning a called line assigned a number corresponding to said dial pulses, and means at said link thereafter responsive to a signal indicative of the condition of said called line transmitted over the other common connection during said scanning periods for transmitting a signal corresponding to said condition to the calling line.

23. A communication arrangement comprising a number of lines, a plurality of links having several common connections to said lines, an arrangement whereby each link is cyclically scanned in a time period individual thereto, means common to all of said links and effective during each period for simultaneously scanning a line, said means effective on initiation of a call from one of said lines when said line is scanned for rendering a simultaneously scanned link conditioned over one of said common connections, said conditioned link effective for controlling said means to scan the same line during a number of its succeeding scanning periods, means effective to transmit dial pulses over said connection during said succeeding scanning periods, means commonly associated with all of said links responsive to said transmitted dial pulses whenever said conditioned link is scanned for scanning a called line assigned a number corresponding to said dial pulses, and means at said conditioned link thereafter responsive to a signal corresponding to the condition of said called line transmitted over the other common connection during said scanning periods to enable a party at the calling line to be informed of said condition.

24. A communication arrangement comprising a number of links, a plurality of lines, a common connection between said links and said lines, an arrangement whereby each link is cyclically scanned for a period individual thereto, means common to all said links and effective during each period for simultaneously scanning a line, said means effective on initiation of a call from one of said lines when said line is scanned for rendering a simultaneously scanned link conditioned over said common connection, said conditioned link effective for controlling said means to scan the same line during its succeeding scanned periods, pulse responsive means effective on the transmission of dial pulses over said connection during said succeeding scanning periods for scanning a called line assigned a number corresponding to said dial pulses, another common connection between said links and said lines, and means at said conditioned link thereafter responsive to a signal corresponding to the condition of said called line transmitted over the other common connection during said scanning periods for enabling the call to proceed in accordance with the condition of said called line.

25. A pulse repeating circuit comprising a flip flop electronic valve arrangement to which a pulse applied in conjunction with a steady voltage of one amplitude controls said flip flop to provide an output voltage of one type, said flip flop arranged to provide an output voltage of another type on a change in said steady voltage, a differentiating circuit arranged to supply a pulse in correspondence with the change between the first type of output voltage and said other type of output voltage, a circuit responsive thereto for providing a control voltage corresponding to said change, a delay circuit for restraining the application of said control voltage until said steady voltage in conjunction with a pulse is again applied to said flip flop for providing said first type of output voltage, and an output circuit rendered effective by said control voltage and said output voltage of said first type to provide an output pulse.

26. A pulse repeating circuit comprising a first circuit to which a pulse applied in conjunction with a steady voltage of one amplitude controls said first circuit to provide an output voltage of one type, said circuit arranged to supply an output voltage of another type on a change in said steady voltage, a differentiating circuit arranged to supply a pulse in correspondence with the change between the first type of output voltage and said other type of output voltage, a circuit responsive thereto for providing a voltage corresponding to said change, and an output circuit rendered effective by the application thereto of said corresponding voltage and said output voltage of said first type to provide an output pulse.

27. A scanning arrangement comprising a first group of electrical circuits responsive to an electrical pulse corresponding to the condition of a memory for providing a scanning pulse corresponding to the memory condition, means associated with said circuits and controlled thereby for providing a pulse for conditioning said memory, and means controlled if said scanning pulse encounters one condition for causing said circuit controlled means to set said memory in its original condition and controlled if said scanning pulse encounters another condition to set said memory in another condition.

28. A scanning arrangement comprising a first group of electrical circuits, each of which is responsive only to an electrical pulse individually corresponding to a different memory condition for providing a scanning pulse corresponding to said memory condition, means associated with said circuits and controlled thereby for providing a pulse for conditioning said memory, and means controlled if said scanning pulse encounters one condition for causing said means to set said memory in the same condition and controlled if said scanning pulse encounters another condition for setting said memory in different condition.

29. In a telephone system, a plurality of lines, a plurality of links, a common connection between said links and said lines, means for scanning each link successively for a particular time period to produce electrical pulses individually corresponding to several lines, a matrix common to all of said links responsive to said electrical pulses for producing a number of pulses for application to said several lines, certain of said pulses effective to transmit a calling condition signal over said common connection to the scanned link only if they are simultaneously applied to a line initiating a call.

30. In a system such as described in claim 29, another common connection between said links and said lines, and a matrix responsive to dial impulses individual to a called line transmitted through said link over said first common connection for causing a test of the condition of said called line over said other common connection.

31. A link for extending a connection from one of a plurality of calling lines, a common connection from said lines to said link comprising means effective or initiation of a call from one of said lines for transmitting a calling condition signal over said common connection to said link, means thereafter operated for enabling the periodic scanning of said line to permit said calling condition signal to be repeated on each scanning over said common connection and for preventing said calling condition signal from being transmitted by another calling line over said common connection.

32. In a link such as claimed in claim 31, means responsive to dial pulses transmitted over said common connection during said scanning periods for enabling the scanning of a called line corresponding to said dial pulses simultaneously with said calling line.

33 For use with a plurality of links such as described in claim 31, an allotter arranged to select an idle one of said links.

34. A transistor oscillator comprising a transformer having several windings, a transistor having its base circuit connected to ground through one winding of said transformer, a collector circuit for said transistor connected to battery through another winding of said transformer, and means whereby an electrical pulse is applied to said base circuit to render said transistor conductive to pass current through said collector circuit, said transformer winding in said collector circuit thereby rendered effective to induce a voltage in said base circuit transformer winding to maintain said transistor conductive for a predetermined time period.

35. A memory comprising an array of elements each having two states of remanent magnetization, one of which is arranged in one state of remanent magnetization and the others arranged in another state of remanent magnetization, a lead common to all of said elements for applying an electrical pulse thereto whereby the state of remanent magnetization of said one element is altered to said other state, a lead individual to each of said elements, the lead for the element whose state of remanent magnetization is altered having an electrical pulse applied thereto on the change in state of said element, and means for applying a pulse to one of said individual leads while a pulse is applied to said common lead whereby an element corresponding to said individual lead is placed in said one state of remanent magnetization.

36. In an arrangement such as described in claim 35, another array of elements individually corresponding to each of said first elements, and another lead common to said other array of elements, each individual lead also individual to each element in said other array whereby one element of the two arrays is placed in said one state of remanent magnetization when electrical pulses of said predetermined type are applied to the common lead of its array and to its individual level.

37. A telephone system comprising a plurality of calling lines, a plurality of links, a common connection between said lines and said links, a plurality of memories each individual to a different link, means common to said memories and controlled by each memory in sequence for testing any of said lines, and means controlled over said common connection in the event a line has initiated a call when tested for controlling the memory controlling said common means to test said line in a succeeding test.

38. A communication system comprising a plurality of lines, a plurality of links, a common connection between said lines and said links, a plurality of memories each individual to a different link, means common to said memories and controlled for a particular period by each memory in a cyclic sequence for testing any one of said lines to extend a signal over said common connection when a certain condition exists at a tested line, and last means at each link responsive to said signal only when its associated memory is controlling said common means for controlling its associated memory to control said common means to test said line in a succeeding sequence.

39. In a system such as claimed in claim 38 a gate circuit for each line, and means at each line for controlling its associated gate circuit to extend a signal over said common connection when the line is in said certain condition and is tested.

40. In a system such as claimed in claim 39, a speech transmission circuit connected in common between said links and said lines, means controlled over said speech transmission circuit when a line is tested and said certain condition exists for preventing a signal from being transmitted over said common connection when said tested line is again tested except if said test is performed under control of memory controlled by the last means to test said line in a succeeding sequence.

41. A communication system comprising a plurality of lines, a speech transmission circuit connected in common between said lines and said links, another common connection between each of said lines and said links, and means controlled over said other common connection for establishing calls between said stations through reoperation links in response to signals transmitted over said other common connections during time periods individual to each link whereby said speech transmission circuit is enabled to carry signals individual to each call during time periods individual to each call.

42. In a system such as claimed in claim 41, means controlled over said speech transmission circuit for preventing said other common connection from transmitting signals to said respective links except during time periods individual to said respective links.

References Cited in the file of this patent
UNITED STATES PATENTS

| | | |
|---|---|---|
| 2,424,281 | McClew et al. | July 22, 1947 |
| 2,680,160 | Yaeger | June 1, 1954 |
| 2,700,148 | McGuigan et al. | Jan. 18, 1955 |
| 2,747,020 | Levy | May 22, 1956 |